(12) United States Patent
Reichert et al.

(10) Patent No.: US 6,592,634 B1
(45) Date of Patent: Jul. 15, 2003

(54) REACTIVE DYES, PROCESSES FOR THEIR PREPARATION AND THEIR USE

(75) Inventors: Hans Reichert, Rheinfelden (DE); Thomas Verdugo, Lausen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/521,711

(22) Filed: Mar. 9, 2000

(30) Foreign Application Priority Data

Mar. 15, 1999 (EP) .............................. 99810229

(51) Int. Cl.$^7$ .................. D06P 1/382; D06P 1/384; D06P 3/66; C07D 498/00; C09B 62/08; C09B 62/507

(52) U.S. Cl. ................. 8/549; 8/918; 544/76; 534/635; 534/642

(58) Field of Search ............... 544/76; 8/549, 8/918; 534/635, 642

(56) References Cited

U.S. PATENT DOCUMENTS

| | | | |
|---|---|---|---|
| 4,604,459 A | 8/1986 | Jäger | 544/76 |
| 4,841,049 A | 6/1989 | Seitz | 544/76 |
| 5,057,609 A | 10/1991 | Jäger et al. | 544/75 |
| 5,081,296 A | 1/1992 | Tzikas et al. | 564/166 |
| 5,084,562 A | 1/1992 | Tzikas | 534/618 |
| 5,837,869 A | * 11/1998 | Inoue et al. | |
| 5,880,282 A | * 3/1999 | Harms et al. | |

FOREIGN PATENT DOCUMENTS

| | | |
|---|---|---|
| EP | 0134033 | 3/1985 |
| EP | 0472975 | 3/1992 |
| EP | 681005 | * 4/1995 |
| EP | 0697443 | 2/1996 |
| JP | 2-209969 | * 8/1990 |
| JP | 02-209969 | * 8/1990 |
| JP | 2-209970 | * 8/1990 |

OTHER PUBLICATIONS

Derwent Abstract 85–063538/11 for EP 134033 May 1985.
Derwent Abstract 96–107293/12 for EP 697443 Feb. 1996.
Chem. Abstr. 114: 64255s for JP 02209970 Aug. 1990.
Chem. Abstr. 114:64256t for JP 02209969 Aug. 1990.

* cited by examiner

Primary Examiner—Margaret Einsmann
(74) Attorney, Agent, or Firm—Kevin T. Mansfield

(57) ABSTRACT

Reactive dyes of the formula (1)

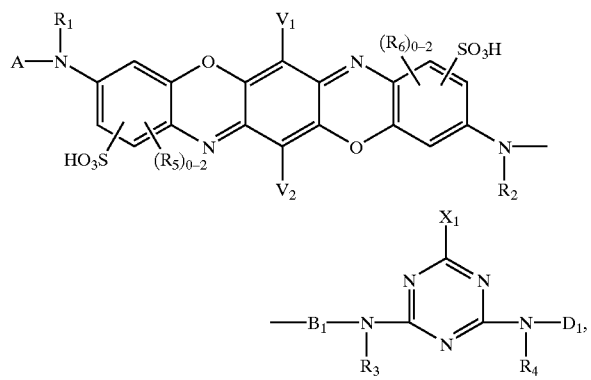

(1)

in which $R_1$, $R_2$, $R_3$ and $R_4$ independently of one another are hydrogen or substituted or unsubstituted $C_1$–$C_4$alkyl, $(R_5)_{0-2}$ and $(R_6)_{0-2}$ independently of one another are 0 to 2 identical or different substituents from the group consisting of $C_1$–$C_4$alkyl, $C_1$–$C_4$alkoxy, $C_2$–$C_4$alkanoylamino, halogen, carboxyl, sulfo, carbamoyl, N-$C_1$–$C_4$alkylcarbamoyl, N,N-di-$C_1$–$C_4$alkylcarbamoyl, $C_1$–$C_4$alkylsulfonyl, sulfamoyl, N-$C_1$–$C_4$alkylsulfamoyl and N,N-di-$C_1$–$C_4$alkylsulfamoyl, A is hydrogen or $C_1$–$C_4$alkyl which is unsubstituted or substituted by hydroxyl, sulfo, carboxyl or sulfato, phenyl or naphthyl which are unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen, phenyl-$C_1$–$C_4$alkylene which is unsubstituted or substituted in the phenyl ring by $C_1$–$C_4$alkyl, $C_1$–$C_4$alkoxy, $C_2$–$C_4$alkanoylamino, hydroxyl, carboxyl, sulfo, carbamoyl, ureido or halogen, or $C_5$–$C_7$cycloalkyl which is unsubstituted or substituted by $C_1$–$C_4$alkyl, $B_1$ is an aliphatic or aromatic bridge member, and the remaining substituents are described in the specification.

12 Claims, No Drawings

REACTIVE DYES, PROCESSES FOR THEIR PREPARATION AND THEIR USE

The present invention relates to novel unsymmetric dioxazine dyes which are fibre-reactive, processes for their preparation and their use for dyeing or printing fibre materials.

The practice of dyeing using reactive dyes has recently led to increased requirements regarding the quality of the dyeings and the profitability of the dyeing process. There consequently continues to be a demand for novel reactive dyes which have improved properties, in particular in respect of application.

Reactive dyes which have a high degree of exhaustion and a high degree of fixing, in particular no alkaline aftertreatment for removal of unfixed dye being necessary, are nowadays required for dyeing. These dyes should furthermore have a good tinctorial yield and a high reactivity. EP-A-0 260 227 and U.S. Pat. No. 4,841,049 disclose unsymmetric, fibre-reactive dioxazine dyes. However, all the properties of the known dyes do not meet the requirements mentioned.

The present invention is therefore based on the object of providing novel, improved fibre-reactive dioxazine dyes for dyeing and printing fibre materials which have the qualities characterized above to a high degree. The novel dyes should have the distinctive features in particular of high degrees of exhaustion, high fixing yields and high fibre-dye bond stabilities. They should furthermore produce dyeings with good all-round properties, for example light- and wet-fastness properties.

It has been found that the stated object is substantially achieved by the reactive dyes defined below.

The present invention thus provides reactive dyes of the formula (1)

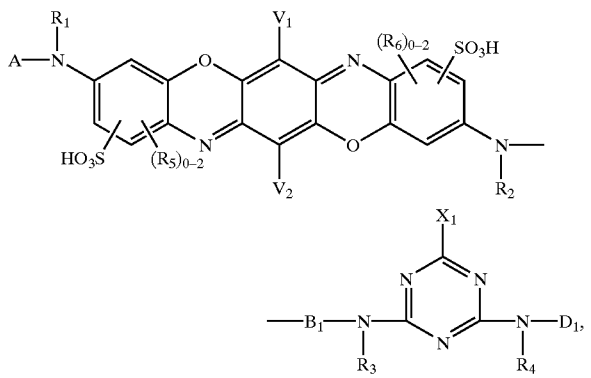

(1)

in which $R_1$, $R_2$, $R_3$ and $R_4$ independently of one another are hydrogen or substituted or unsubstituted $C_1$–$C_4$alkyl, $(R_5)_{0-2}$ and $(R_6)_{0-2}$ independently of one another are 0 to 2 identical or different substituents from the group consisting of $C_1$–$C_4$alkyl, $C_1$–$C_4$alkoxy, $C_2$–$C_4$alkanoylamino, halogen, carboxyl, sulfo, carbamoyl, N-$C_1$–$C_4$alkylcarbamoyl, N,N-di-$C_1$–$C_4$alkylcarbamoyl, $C_1$–$C_4$alkylsulfonyl, sulfamoyl, N-$C_1$–$C_4$alkylsulfamoyl and N,N-di-$C_1$–$C_4$alkylsulfamoyl, A is hydrogen or $C_1$–$C_4$alkyl which is unsubstituted or substituted by hydroxyl, sulfo, carboxyl or sulfato, phenyl or naphthyl which are unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen, phenyl-$C_1$–$C_4$alkylene which is unsubstituted or substituted in the phenyl ring by $C_1$–$C_4$alkyl, $C_1$–$C_4$alkoxy, $C_2$–$C_4$alkanoylamino, hydroxyl, carboxyl, sulfo, carbamoyl, ureido or halogen, or $C_5$–$C_7$cycloalkyl which is unsubstituted or substituted by $C_1$–$C_4$alkyl, $B_1$ is an aliphatic or aromatic bridge member, $D_1$ is a radical of the aliphatic, aromatic or heterocyclic series which is substituted by at least one fibre-reactive group, $V_1$ and $V_2$ independently of one another are hydrogen, halogen, $C_1$–$C_4$alkyl, $C_1$–$C_4$alkoxy, or substituted or unsubstituted phenyl, phenoxy, $C_2$–$C_6$alkanoylamino or benzoylamino and $X_1$ is halogen, hydroxyl, $C_1$–$C_4$alkoxy, $C_1$–$C_4$alkylthio, substituted or unsubstituted amino or an N-heterocycle which may contain further heteroatoms, with the proviso that A and $R_1$ are not hydrogen if $B_1$ is ethylene, 1,3-propylene, 1,4-butylene, phenylene which is unsubstituted or substituted by sulfo, or 1,4-cyclohexylene, or the radical

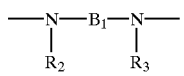

is piperazine and

A is not hydroxyethyl and $R_1$ is not hydrogen if $B_1$ is ethylene and $X_1$ is 2,6-di-sulfophenylamino.

Alkyl radicals $R_1$, $R_2$, $R_3$ and $R_4$ are straight-chain or branched. The alkyl radicals can be further substituted, for example by hydroxyl, sulfo, sulfato, cyano or carboxyl. Examples are the following radicals: methyl, ethyl, n-propyl, isopropyl, n-butyl, isobutyl, sec-butyl and tert-butyl, and the corresponding radicals substituted by hydroxyl, sulfo, sulfato, cyano or carboxyl. Preferred substituents are hydroxyl, sulfo, sulfato or carboxyl, in particular hydroxyl or sulfato. The radical $R_4$ is also a radical of the formula —$(CH_2)_2$—$SO_2$—$(CH_2)_2$—Cl.

$C_1$–$C_4$alkyl $(R_5)_{0-2}$, $(R_6)_{0-2}$, $V_1$ and $V_2$ independently of one another are, for example, methyl, ethyl, n-propyl, isopropyl, n-butyl, sec-butyl, tert-butyl or isobutyl, preferably methyl or ethyl, and in particular methyl, the definitions and preferences also applying to the following $C_1$–$C_4$alkyl radicals.

$C_1$–$C_4$alkoxy $(R_5)_{0-2}$, $(R_6)_{0-2}$, $V_1$, $V_2$ and $X_1$ independently of one another are, for example, methoxy, ethoxy, n-propoxy, isopropoxy, n-butoxy or isobutoxy, preferably methoxy or ethoxy and in particular methoxy, the definitions and preferences mentioned also applying to the following $C_1$–$C_4$alkoxy radicals.

$C_2$–$C_4$alkanoylamino $(R_5)_{0-2}$ and $(R_6)_{0-2}$ are, for example, acetylamino or propionylamino, in particular acetylamino, the definitions and preferences mentioned also applying to the following $C_2$–$C_4$alkanoylamino radicals.

Halogen $(R_5)_{0-2}$, $(R_6)_{0-2}$, $V_1$ and $V_2$ independently of one another are, for example, fluorine, chlorine or bromine, preferably chlorine or bromine and in particular chlorine.

N-$C_1$–$C_4$alkylcarbamoyl $(R_5)_{0-2}$ and $(R_6)_{0-2}$ independently of one another are, for example, N-methyl-, N-ethyl-, N-propyl-, N-isopropyl-, N-butyl-, N-sec-butyl-, N-tert-butyl- or N-isobutylcarbamoyl, preferably N-methyl- or N-ethylcarbamoyl and in particular N-methylcarbamoyl.

N,N-di-$C_1$–$C_4$alkylcarbamoyl $(R_5)_{0-2}$ and $(R_6)_{0-2}$ independently of one another are, for example, N,N-di-methyl-, N,N-di-ethyl-, N,N-di-propyl-, N,N-di-isopropyl-, N,N-di-butyl-, N,N-di-sec-butyl- or N,N-di-isobutylcarbamoyl, preferably N,N-di-methyl- or N,N-di-ethylcarbamoyl and in particular N,N-di-methylcarbamoyl.

$C_1$–$C_4$alkylsulfonyl $(R_5)_{0-2}$ and $(R_6)_{0-2}$ independently of one another are, for example, methyl-, ethyl-, n-propyl-, isopropyl-, n-butyl-, sec-butyl-, tert-butyl- or isobutylsulfonyl, preferably methyl- or ethylsulfonyl, and in particular methylsulfonyl.

N-$C_1$–$C_4$alkylsulfamoyl $(R_5)_{0-2}$ and $(R_6)_{0-2}$ independently of one another are, for example, N-methyl-, N-ethyl-, N-propyl-, N-isopropyl-, N-butyl-, N-sec-butyl-, N-tert-butyl- or N-isobutylsulfamoyl, preferably N-methyl- or N-ethylsulfamoyl and in particular N-methylsulfamoyl.

N,N-di-$C_1$–$C_4$alkylsulfamoyl $(R_5)_{0-2}$ and $(R_6)_{0-2}$ independently of one another are, for example, N,N-di-methyl-, N,N-di-ethyl-, N,N-di-propyl-, N,N-di-isopropyl-, N,N-di-butyl-, N,N-di-sec-butyl- or N,N-di-isobutylsulfamoyl, preferably N,N-di-methyl- or N,N-di-ethylsulfamoyl and in particular N,N-di-methylsulfamoyl.

In a preferred embodiment of the reactive dyes according to the invention, A is $C_1$–$C_4$alkyl, which is unsubstituted or substituted by hydroxyl, sulfo, carboxyl or sulfato, phenyl or naphthyl which are unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen, in particular phenyl which is unsubstituted or substituted by the radicals mentioned, phenyl-$C_1$–$C_4$alkylene which is unsubstituted or substituted in the phenyl ring by $C_1$–$C_4$-alkyl, $C_1$–$C_4$alkoxy, $C_2$–$C_4$alkanoylamino, hydroxyl, carboxyl, sulfo, carbamoyl, ureido or halogen, or $C_5$–$C_7$-cycloalkyl which is unsubstituted or substituted by $C_1$–$C_4$alkyl.

A in the reactive dyes according to the invention is particularly preferably $C_1$–$C_4$alkyl which is unsubstituted or substituted by hydroxyl, sulfo, carboxyl or sulfato, preferably hydroxyl or sulfato, and in particular sulfato. The substituted alkyl radicals are preferred.

An aliphatic bridge member $B_1$ is, for example, a $C_2$–$C_{12}$alkylene radical, in particular a $C_2$–$C_6$alkylene radical, which can be interrupted by 1, 2 or 3 members from the group consisting of —NH—, —N(CH$_3$)— and, in particular, —O— and is unsubstituted or substituted by hydroxyl, sulfo, sulfato, cyano or carboxyl. Preferred substituents of the alkylene radicals $B_1$ are hydroxyl, sulfo or sulfato, in particular hydroxyl or sulfato.

Aliphatic bridge members $B_1$ are furthermore, for example, $C_5$–$C_9$-cycloalkylene radicals, in particular cyclohexylene radicals. The cycloalkylene radicals mentioned can be unsubstituted or substituted by $C_1$–$C_4$alkyl, $C_1$–$C_4$alkoxy, $C_2$–$C_4$alkanoylamino, sulfo, halogen or carboxyl, in particular by $C_1$–$C_4$alkyl. Aliphatic bridge members $B_1$ are furthermore methylenecyclohexylene, ethylenecyclohexylene or methylenecyclohexylenemethylene radicals which are unsubstituted or substituted in the cyclohexylene ring by $C_1$–$C_4$alkyl, in particular methyl.

The radical of the formula

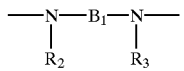

is, for example, also a radical of the formula

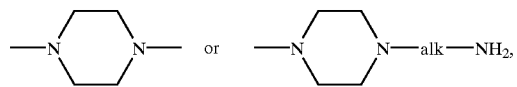

in which alk is $C_1$–$C_4$alkylene, for example ethylene.

An aromatic bridge member $B_1$ is, for example, $C_1$–$C_6$alkylphenylene, for example methylenephenylene, $C_1$–$C_4$alkylenephenylen-$C_1$–$C_4$alkylene, for example methylenephenylenemethylene, or phenylene which are unsubstituted or substituted by $C_1$–$C_4$alkyl, $C_1$–$C_4$alkoxy, $C_2$–$C_4$alkanoylamino, sulfo, halogen or carboxyl, or a radical of the formula

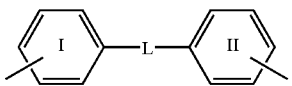

in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and L is the direct bond or a $C_2$–$C_{10}$alkylene radical, which can be interrupted by 1, 2 or 3 oxygen atoms, or L is a bridge member of the formula —CH=CH—, —N=N—, —NH—, —CO—, —NH—CO—, —NH—SO$_2$— —NH—CO—NH—, —O—, —S— or —SO$_2$—. An aromatic bridge member $B_1$ is preferably phenylene, which can be substituted as defined above. Preferably, the aromatic bridge members $B_1$ are unsubstituted or substituted by sulfo.

$B_1$ is preferably a $C_2$–$C_{12}$alkylene radical, which can be interrupted by 1, 2 or 3 members from the group consisting of —NH—, —N(CH$_3$)— or —O— and is unsubstituted or substituted by hydroxyl, sulfo, sulfato, cyano or carboxyl;

a $C_5$–$C_9$-cycloalkylene radical, $C_1$–$C_6$alkylenephenylene radical or phenylene radical which are unsubstituted or substituted by $C_1$–$C_4$alkyl, $C_1$–$C_4$alkoxy, $C_2$–$C_4$alkanoylamino, sulfo, halogen or carboxyl; or the radical of the formula

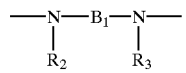

is a radical of the formula

$B_1$ is particularly preferably a $C_2$–$C_{12}$alkylene radical, which can be interrupted by 1, 2 or 3 members —O— and is unsubstituted or substituted by hydroxyl, sulfo, sulfato, cyano or carboxyl, or a phenylene radical which is unsubstituted or substituted by $C_1$–$C_4$alkyl, $C_1$–$C_4$alkoxy, $C_2$–$C_4$alkanoylamino, sulfo, halogen or carboxyl.

$B_1$ is especially preferably a $C_2$–$C_{12}$alkylene radical, in particular a $C_2$–$C_6$alkylene radical, for example 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene or the radicals of the formula

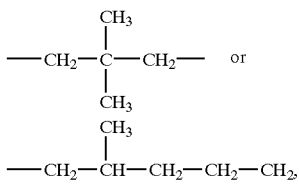

which can be interrupted by 1, 2 or 3 members —O— and is unsubstituted or substituted by hydroxyl or sulfato, and is preferably not interrupted by —O—.

Especially important bridge members $B_1$ are those of the formula —$CH_2$—$CH(R_7)$— or —$(R_7)CH$—$CH_2$—, in which $R_7$ is $C_1$–$C_4$alkyl, in particular methyl.

Fibre-reactive radicals contained in the radical $D_1$ are to be understood as meaning those which are capable of reacting with the hydroxyl groups of cellulose, the amino, carboxyl, hydroxyl and thiol groups in wool and silk, or the amino and any carboxyl groups of synthetic polyamides to form covalent chemical bonds. The fibre-reactive radicals are as a rule bonded to the dye radical directly or via a bridge member. Suitable fibre-reactive radicals are, for example, those which contain at least one substituent which can be split off from an aliphatic, aromatic or heterocyclic radical, or in which the radicals mentioned contain a radical which is capable of reaction with the fibre material, for example a vinyl radical.

Preferred fibre-reactive radicals $D_1$ are the radicals of the formula (2a), (2b), (2c), (2d), (2e), (2f) or (2g)

—$SO_2$—Y    (2a),

—NH—CO—$(CH_2)_l$—$SO_2$—Y    (2b),

—$CONR_8$—$(CH_2)_m$—$SO_2$—Y    (2c),

—NH—CO—CH(hal)—$CH_2$—hal    (2d),

—NH—CO—C(hal)=$CH_2$    (2e),

    (2f)

    (2g)

in which hal is chlorine or bromine;

$X_2$ is halogen, 3-carboxypyridin-1-yl or 3-carbamoylpyridin-1-yl;

$T_1$ independently has the meaning of $X_2$, is a substituent which is not fibre-reactive or is a fibre-reactive radical of the formula (3a), (3b), (3c), (3d), (3e) or (3f)

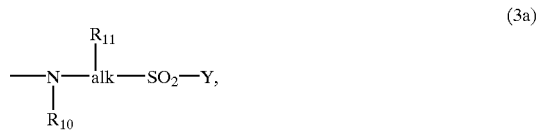    (3a)

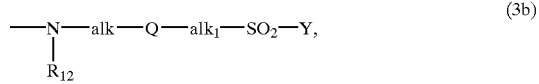    (3b)

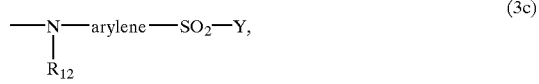    (3c)

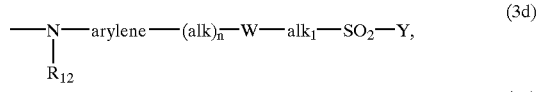    (3d)

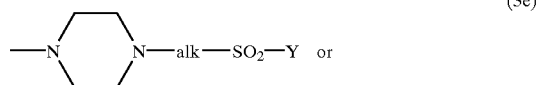    (3e)

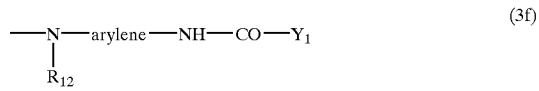    (3f)

in which $R_8$ and $R_{10}$ independently of one another are each hydrogen, $C_1$–$C_4$alkyl which is unsubstituted or substituted by hydroxyl, sulfo, sulfato, carboxyl or cyano or a radical

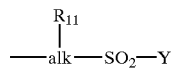

$R_9$ and $R_{12}$ independently of one another are each hydrogen or $C_1$–$C_4$alkyl, $R_{11}$ is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Y, alk and $alk_1$ independently of one another are linear or branched $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, Q is a radical —O— or —$NR_{12}$—, in which $R_{12}$ is as defined above, W is a group —$SO_2$—$NR_8$—, —$CONR_8$— or —$NR_8CO$—, in which $R_8$ is as defined above, Y is vinyl or a radical —$CH_2$—$CH_2$—U and U is a group which can be split off under alkaline conditions, $Y_1$ is a group —CH(hal)—$CH_2$—hal or —C(hal)=$CH_2$ and hal is chlorine or bromine and l and m independently of one another are an integer from 1 to 6 and n is the number 0 or 1; and $X_3$ is halogen or $C_1$–$C_4$alkylsulfonyl;

$X_4$ is halogen or $C_1$–$C_4$alkyl and $T_2$ is hydrogen, cyano or halogen.

A group U which can be split off under alkaline conditions is, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—$N(C_1$–$C_4$alkyl$)_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$ and particularly preferably —$OSO_3H$.

Examples of suitable radicals Y are accordingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl and in particular vinyl or β-sulfatoethyl.

$R_8$ and $R_{10}$ independently of one another are preferably hydrogen or $C_1$–$C_4$alkyl, such as methyl, ethyl, propyl, isopropyl, butyl, isobutyl, sec-butyl or tert-butyl, and particularly preferably hydrogen, methyl or ethyl. $R_8$ and $R_{10}$ are particularly preferably hydrogen.

$R_9$ and $R_{12}$ independently of one another are each preferably hydrogen, methyl or ethyl, and particularly preferably hydrogen.

$R_{11}$ is preferably hydrogen.

l and m independently of one another are preferably the number 2, 3 or 4, and particularly preferably the number 2 or 3.

Especially preferably, l is the number 3 and m is the number 2.

A non-reactive substituent $T_1$ can be, for example, hydroxyl; $C_1$–$C_4$alkoxy; $C_1$–$C_4$alkylthio which is unsubstituted or substituted by hydroxyl, carboxyl or sulfo; amino; amino which is mono- or disubstituted by $C_1$–$C_8$alkyl, where the alkyl is unsubstituted or further substituted, for example by sulfo, sulfato, hydroxyl, carboxyl or phenyl, in particular by sulfo or hydroxyl, and is uninterrupted or interrupted by a radical —O—; cyclohexylamino; morpholino; N-$C_1$–$C_4$alkyl-N-phenylamino or phenylamino or naphthylamino, where the phenyl or naphthyl is unsubstituted or substituted, for example by $C_1$–$C_4$alkyl, $C_1$–$C_4$alkoxy, carboxyl, sulfo or halogen.

Examples of suitable non-reactive substituents $T_1$ are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or isopropoxy and hydroxyl.

A radical $T_1$ which is not fibre-reactive is preferably $C_1$–$C_4$alkoxy, $C_1$–$C_4$alkylthio which is unsubstituted or substituted by hydroxyl, carboxyl or sulfo, hydroxyl, amino, N-mono- or N,N-di-$C_1$–$C_4$alkylamino which are unsubstituted or substituted in the alkyl part by hydroxyl, sulfato or sulfo, morpholino, phenylamino or N-$C_1$–$C_4$alkyl-N-phenylamino, which are unsubstituted or substituted in the phenyl ring by sulfo, carboxyl, chlorine, acetylamino, methyl or methoxy and in which the alkyl is unsubstituted or substituted by hydroxyl, sulfo or sulfato, or naphthylamino which is unsubstituted or substituted by 1 to 3 sulfo groups.

Particularly preferred radicals $T_1$ which are not fibre-reactive are amino, N-methylamino, N-ethylamino, morpholino, phenylamino, 2-, 3- or 4-sulfophenylamino or N-$C_1$–$C_4$alkyl-N-phenylamino.

Halogen $X_2$ is, for example, fluorine, chlorine or bromine, and in particular chlorine or fluorine.

Halogen $T_2$, $X_3$ and $X_4$ are, for example, fluorine, chlorine or bromine, in particular chlorine or fluorine.

$C_1$–$C_4$alkylsulfonyl $X_3$ is, for example, ethylsulfonyl or methylsulfonyl, and in particular methylsulfonyl.

$C_1$–$C_4$alkyl $X_4$ is, for example, methyl, ethyl, n- or isopropyl, n-, iso or tert-butyl and in particular methyl.

$X_3$ and $X_4$ are preferably independently of one another chlorine or fluorine.

$T_2$ is preferably cyano or chlorine.

Hal is preferably bromine.

Alk and $alk_1$ independently of one another are, for example, a methylene-, ethylene-, 1,3-propylene-, 1,4-butylene-, 1,5-pentylene- or 1,6-hexylene radical or branched isomers thereof.

Preferably, alk and $alk_1$ independently of one another are each a $C_1$–$C_4$alkylene radical, and particularly preferably an ethylene radical or propylene radical.

Arylene is preferably a 1,3- or 1,4-phenylene radical which is unsubstituted or substituted, for example, by sulfo, methyl, methoxy or carboxyl, and particularly preferably an unsubstituted 1,3- or 1,4-phenylene radical.

Q is preferably —NH— or —O—, and particularly preferably —O—.

W is preferably a group of the formula —CONH— or —NHCO—, in particular a group of the formula —CONH—.

n is preferably the number 0.

The reactive radicals of the formulae (3a) to (3f) are preferably those in which W is a group of the formula —CONH—, $R_{10}$, $R_{11}$ and $R_{12}$ are each hydrogen, Q is the radical —O— or —NH—, alk and $alk_1$ independently of one another are each ethylene or propylene, arylene is phenylene which is unsubstituted or substituted by methyl, methoxy, carboxyl or sulfo, Y is vinyl, β-chloroethyl or β-sulfatoethyl, $Y_1$ is —CHBr—CH$_2$Br or —CBr=CH$_2$ and n is the number 0.

Fibre-reactive radicals $D_1$ are particularly preferably radicals of the formula (2a), (2c), (2d), (2e) or (2f) in which Y is vinyl, β-chloroethyl or β-sulfatoethyl, hal is bromine, $R_8$ and $R_9$ are hydrogen, m is the number 2 or 3, $X_2$ is chlorine or fluorine, $T_1$ is $C_1$–$C_4$alkoxy, $C_1$–$C_4$alkylthio, which is unsubstituted or substituted by hydroxyl, carboxyl or sulfo, hydroxyl, amino, N-mono or N,N-di-$C_1$–$C_4$alkylamino which are unsubstituted or substituted in the alkyl moiety by hydroxyl, sulfato or sulfo, morpholino, phenylamino or N-$C_1$–$C_4$alkyl-N-phenylamino, which are unsubstituted or substituted in the phenyl ring by sulfo, carboxyl, chlorine, acetylamino, methyl or methoxy and in which the alkyl is unsubstituted or substituted by hydroxyl, sulfo or sulfato, naphthylamino which is unsubstituted or substituted by 1 to 3 sulfo groups, or a fibre-reactive radical of the formula (3a'), (3b'), (3c'), (3d') or (3f')

(3a')

(3b')

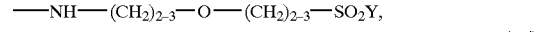

(3c')

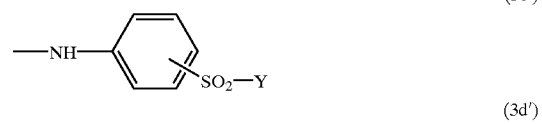

(3d')

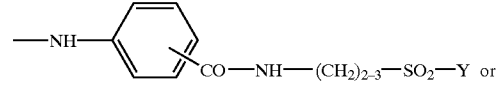

-continued

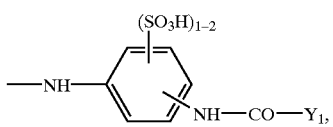
(3f')

in particular (3c') or (3d'), in which

Y is as defined above and $Y_1$ is a group —CH(Br)—CH$_2$—Br or —C(Br)=CH$_2$.

In the case of the radicals of the formulae (3a') and (3b'), Y is preferably β-chloroethyl. In the case of the radicals of the formulae (3c') and (3d'), Y is preferably vinyl or β-sulfatoethyl.

A radical $D_1$ of the aliphatic series is, for example, a radical of the formula

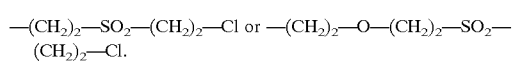

Radicals $D_1$ of the aromatic series are, for example, radicals of the benzene or naphthalene series.

Radicals $D_1$ of the benzene or naphthalene series are, for example, phenyl or naphthyl which are unsubstituted or further substituted by substituents which are not fibre-reactive. Substituents which are not fibre-reactive are, for example, $C_1$–$C_4$alkyl, which is to be understood as meaning methyl, ethyl, n- or iso-propyl, n-, iso-, sec- or tert-butyl; $C_1$–$C_4$alkoxy, which is to be understood as meaning methoxy, ethoxy, n- or iso-propoxy or n-, iso-, sec- or tert-butoxy; hydroxyl-$C_1$–$C_4$alkoxy; phenoxy; $C_2$–$C_6$alkanoylamino which is unsubstituted or substituted in the alkyl moiety by hydroxyl or $C_1$–$C_4$alkoxy, for example acetylamino, hydroxyacetylamino, methoxyacetylamino or propionylamino; benzoylamino which is unsubstituted or substituted in the phenyl moiety by hydroxyl, sulfo, halogen, $C_1$–$C_4$alkyl or $C_1$–$C_4$alkoxy; $C_1$–$C_6$alkoxycarbonylamino which is unsubstituted or substituted in the alkyl moiety by hydroxyl, $C_1$–$C_4$alkyl or $C_1$–$C_4$alkoxy; phenoxycarbonylamino which is unsubstituted or substituted in the phenyl moiety by hydroxyl, $C_1$–$C_4$alkyl or $C_1$–$C_4$alkoxy; amino; N-$C_1$–$C_4$alkyl- or N,N-di-$C_1$–$C_4$alkylamino which are unsubstituted or substituted in the alkyl moiety by hydroxyl, $C_1$–$C_4$alkoxy, carboxyl, cyano, halogen, sulfo, sulfato, phenyl or sulfophenyl, for example methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)-amino, or N-(β-sulfoethyl)-N-benzylamino; cyclohexylamino; N-phenylamino or N-$C_1$–$C_4$alkyl-N-phenylamino which are unsubstituted or substituted in the phenyl moiety by nitro, $C_1$–$C_4$alkyl, $C_1$–$C_4$alkoxy, carboxyl, halogen or sulfo; $C_1$–$C_4$alkoxycarbonyl, for example methoxy- or ethoxycarbonyl; trifluoromethyl; nitro; cyano; halogen, which is to be understood generally as meaning, for example, fluorine, bromine or, in particular, chlorine; ureido; hydroxyl; carboxyl; sulfo; sulfomethyl; carbamoyl; carbamido; sulfamoyl; N-phenylsulfamoyl or N-$C_1$–$C_4$alkyl-N-phenylsulfamoyl which are unsubstituted or substituted in the phenyl moiety by sulfo or carboxyl; and $C_1$–$C_4$alkylsulfonyl, for example, methyl- or ethylsulfonyl.

Radicals $D_1$ of the benzene, naphthalene or heterocyclic series are furthermore, for example, mono- or disazo radicals of the formula (4) or (5)

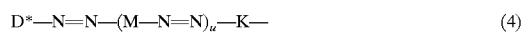

or

in which

D* is the radical of a diazo component of the benzene or naphthalene series,

M is the radical of a middle component of the benzene or naphthalene series,

K is the radical of a coupling component of the bezene, naphthalene, pyrazolone, 6-hydroxypyrid-2-one or acetoacetic acid amide series, and u is the number 0 or 1, preferably 0, where D*, M and K can furthermore carry substituents customary in azo dyes, for example the substituents mentioned above for phenyl or naphthyl $D_1$ which are not fibre-reactive, and preferably $C_1$–$C_4$alkyl or $C_1$–$C_4$alkoxy, which are unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, sulfomethyl, $C_2$–$C_4$alkanoylamino, $C_1$–$C_4$alkylsulfonylamino, benzoylamino which is unsubstituted or substituted in the phenyl ring by $C_1$–$C_4$alkyl, $C_1$–$C_4$alkoxy, halogen or sulfo or phenyl which is unsubstituted or substituted by $C_1$–$C_4$alkyl, $C_1$–$C_4$alkoxy, halogen, carboxyl or sulfo.

Preferred mono- or disazo radicals $D_1$ of the formula (4) or (5) are the radicals of the formula (6a), (6b), (6c), (6d), (6e), (6f), (6g), (6h), (6i), (6j), (6k), (6l), (6m), (6n), or (6o)

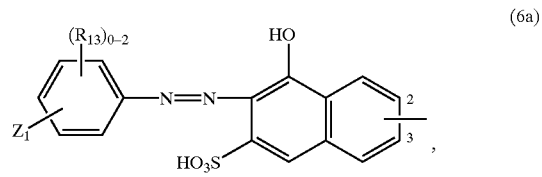

in which $(R_{13})_{0-2}$ is 0 to 2 identical or different substituents from the group consisting of $C_1$–$C_4$alkyl, $C_1$–$C_4$alkoxy, halogen, carboxyl and sulfo and $Z_1$ is a radical of the formula (2a), (2b), (2c), (2d), (2e), (2f) or (2g), where the radicals of the formulae (2a), (2b), (2c), (2d), (2e), (2f) and (2g) are as defined and preferred above,

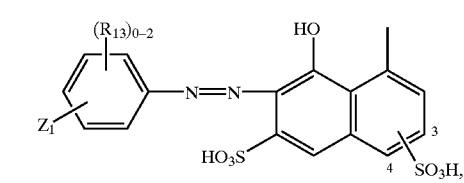

(6b)

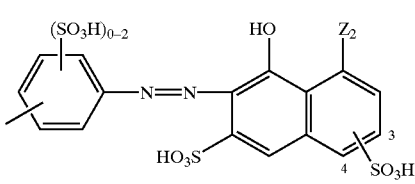

(6h)

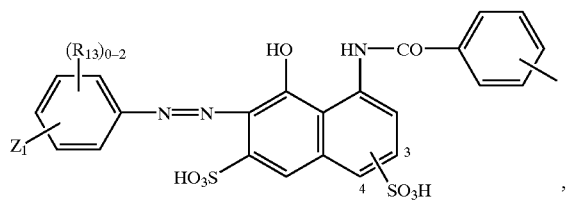

(6c)

in which $Z_2$ is as defined above, in which $(R_{13})_{0-2}$ is as defined above,

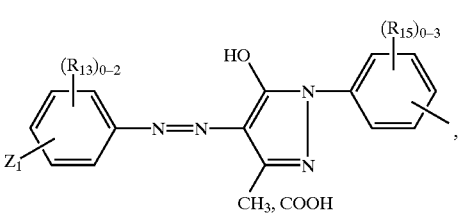

(6i)

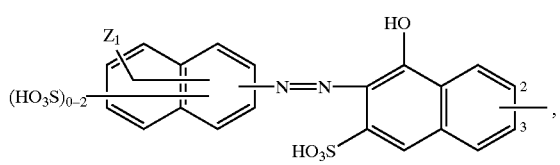

(6d)

in which $(R_{13})_{0-2}$ is as defined above, $(R_{15})_{0-3}$ is 0 to 3 identical or different substituents from the group consisting of $C_1$–$C_4$alkyl, $C_1$–$C_4$alkoxy, halogen, carboxyl and sulfo and $Z_1$ is as defined above,

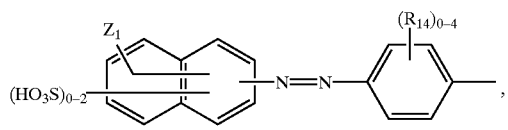

(6e)

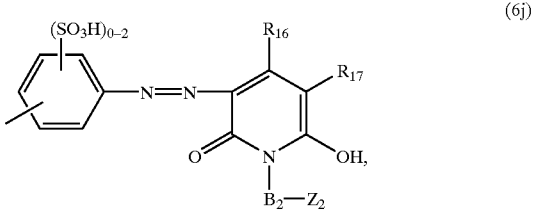

(6j)

in which $(R_{14})_{0-4}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl or $C_1$–$C_4$alkoxy, amino, $C_2$–$C_4$alkanoylamino, ureido, hydroxyl, carboxyl, sulfomethyl, $C_1$–$C_4$alkylsulfonylamino and sulfo and $Z_1$ is as defined above, in which $B_2$ is substituted or unsubstituted $C_2$–$C_6$alkylene, $R_{16}$ is hydrogen, $C_1$–$C_4$alkyl or phenyl, and $R_{17}$ is hydrogen, cyano, carbamoyl or sulfomethyl, and $Z_2$ is as defined above,

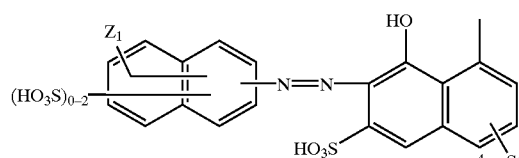

(6f)

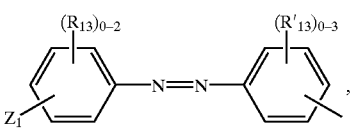

(6k)

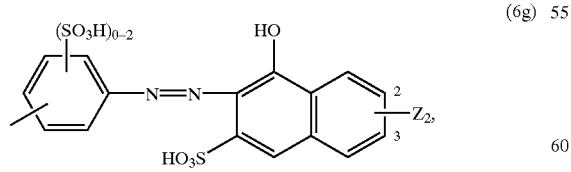

(6g)

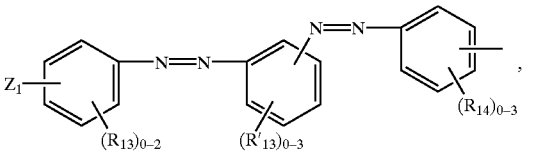

(6l)

in which $Z_1$ is as defined above and $Z_2$ is a radical of the formula (2b), (2d), (2e), (2f) or (2g), where the radicals of the formulae (2b), (2d), (2e), (2f) and (2g) are as defined and preferred above,

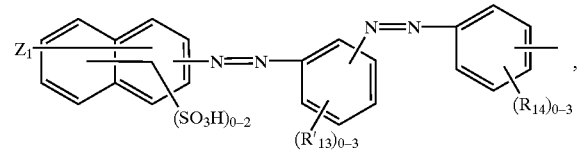

(6m)

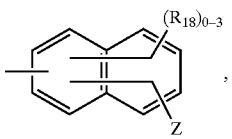

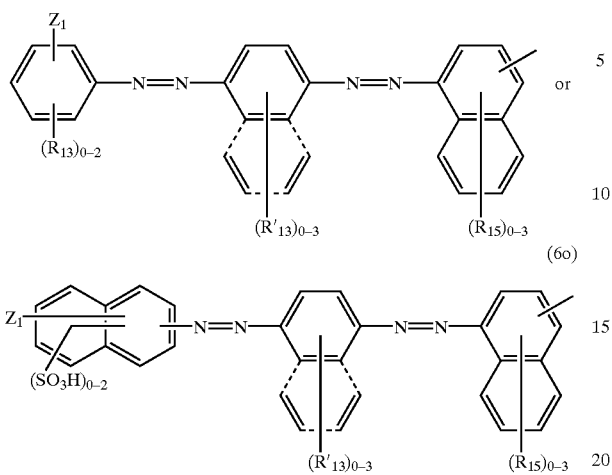

in which (R$_{13}$)$_{0-2}$, (R$_{14}$)$_{0-3}$, (R$_{15}$)$_{0-3}$ and Z$_1$ are each as defined above and (R$_{13}'$)$_{0-3}$ is 0 to 3 identical or different substituents from the group consisting of C$_1$–C$_4$alkyl, C$_1$–C$_4$alkoxy, halogen, carboxyl and sulfo.

The numbers on the naphthyl rings of the radicals of the formula (6a), (6b), (6c), (6d), (6f), (6g) or (6h) identify the possible bonding positions of the corresponding substituents.

C$_1$–C$_4$alkylsulfonylamino (R$_{14}$)$_{0-4}$ is, for example, methyl-, ethyl-, n-propyl-, isopropyl-, n-butyl-, sec-butyl-, tert-butyl- or isobutylsulfonylamino, preferably methyl- or ethylsulfonylamino, and in particular methylsulfonylamino.

C$_2$–C$_6$alkylene B$_2$ are straight-chain or branched alkylene groups, for example 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene or the radicals of the formula

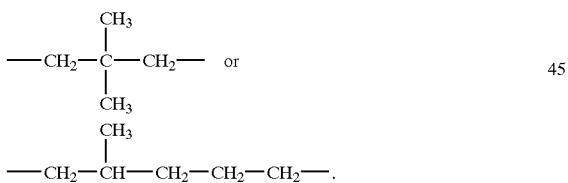

The radicals B$_2$ mentioned are unsubstituted or substituted, for example by hydroxyl, sulfo, carboxyl or sulfato, preferably hydroxyl or sulfato, and in particular sulfato, and are preferably unsubstituted.

B$_2$ is preferably C$_2$–C$_4$alkylene, in particular 1,2-ethylene.

A particularly preferred mono- or disazo radical D$_1$ is the radical of the formula (6j), in which B$_2$, R$_{16}$, R$_{17}$ and Z$_2$ are as defined and preferred above.

In a particular embodiment of the present invention, a radical D$_1$ of the benzene, naphthalene or heterocyclic series is a mono- or disazo radical of the formula (4) or (5), where the radicals of the formula (4) or (5) are as defined or preferred above.

In a preferred embodiment of the reactive dyes according to the invention, D$_1$ is a radical of the formula (7) or (6j')

in which (R$_{18}$)$_{0-3}$ is 0 to 3 identical or different substituents chosen from the group consisting of halogen, C$_1$–C$_4$alkyl, C$_1$–C$_4$alkoxy, carboxyl, nitro and sulfo and Z is a radical of the formula (2a), (2c), (2d), (2e) or (2f), in which R$_8$ and R$_9$ are hydrogen, hal is bromine, Y is vinyl, β-chloroethyl or β-sulfatoethyl, T$_1$ is C$_1$–C$_4$alkoxy, C$_1$–C$_4$alkylthio which is unsubstituted or substituted by hydroxyl, carboxyl or sulfo, hydroxyl, amino, N-mono- or N,N-di-C$_1$–C$_4$alkylamino which are unsubstituted or substituted in the alkyl moiety by hydroxyl, sulfato or sulfo, morpholino, phenylamino or N-C$_1$–C$_4$alkyl-N-phenylamino, which are unsubstituted or substituted in the phenyl ring by sulfo, carboxyl, chlorine, acetylamino, methyl or methoxy and in which the alkyl is unsubstituted or substituted by hydroxyl, sulfo or sulfato, naphthylamino which is unsubstituted or substituted by 1 to 3 sulfo groups, or a fibre-reactive radical of the formula (3c') or (3d')

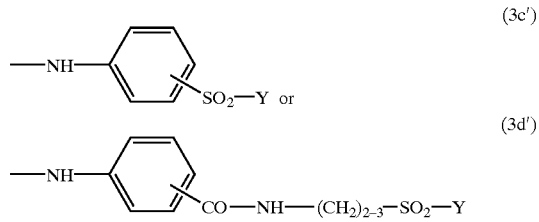

and Y is as defined above,

X$_2$ is chlorine or fluorine and m is the number 2 or 3, in particular 2; or

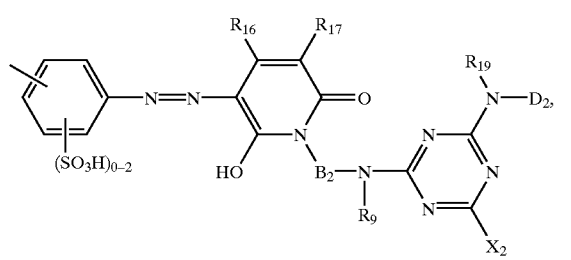

in which

B$_2$ is C$_2$–C$_6$alkylene which is unsubstituted or substituted by hydroxyl, sulfo, carboxyl or sulfato, preferably hydroxyl or sulfato, D$_2$ is a radical of the formula (7) in which (R$_{18}$)$_{0-3}$ is as defined above and Z is a radical of the formula (2a), (2c), (2d) or (2e), in particular (2a), in which R$_8$, hal, Y and m are as defined above, R$_{16}$ is hydrogen, C$_1$–C$_4$alkyl or phenyl, R$_{17}$ is hydrogen, cyano, carbamoyl or sulfomethyl, $R_{19}$ is hydrogen, methyl or ethyl, in particular hydrogen, and $R_9$ and $X_2$ are as defined above.

In a particularly preferred embodiment of the reactive dyes according to the invention, $D_1$ is a radical of the formula (7a), (7b), (7c), (7d) or (6j")

$$\text{(7a)} \quad \begin{array}{c} \overset{3}{\underset{4}{\text{—}}}\text{—SO}_2\text{—Y,} \\ (R_{18})_{0-2} \end{array}$$

$$\text{(7b)} \quad \begin{array}{c} (SO_3H)_{0-2} \\ \text{—} \\ SO_2\text{—Y} \end{array}$$

$$\text{(7c)} \quad \begin{array}{c} (SO_3H)_{0-1} \\ \overset{3}{\underset{4}{\text{—}}}\text{—CO—NH—(CH}_2)_{\overline{m}}\text{—SO}_2\text{—Y,} \end{array}$$

$$\text{(7d)} \quad \begin{array}{c} SO_3H \\ \overset{3}{\underset{4}{\text{—}}}\text{—NH—CO—Y}_1, \end{array}$$

in which $(R_{18})_{0-2}$ is 0 to 2 identical or different substituents chosen from the group consisting of halogen, $C_1$–$C_4$alkyl, $C_1$–$C_4$alkoxy and sulfo, in particular methyl, methoxy and sulfo, Y is vinyl, β-chloroethyl or β-sulfatoethyl, in particular vinyl or β-sulfatoethyl, $Y_1$ is a group —CH(Br)—CH$_2$—Br or —C(Br)=CH$_2$ and m is the number 2 or 3, in particular 2; or $$\text{(6j''')} \quad \begin{array}{c} R_{16} \quad R_{17} \\ \text{—}\overset{}{\underset{}{\text{N=N}}}\text{—}\overset{}{\underset{}{\text{N}}}\text{—}\overset{}{\underset{}{\text{O}}} \quad \text{NH—D}_2, \\ (SO_3H)_{1-2} \quad HO \quad B_2\text{—NH}\overset{}{\underset{}{\text{—}}}\overset{N}{\underset{N}{\text{—}}}\overset{}{\underset{}{\text{—}}}X_2 \end{array}$$

in which $B_2$ is $C_2$–$C_4$alkylene, in particular ethylene, $D_2$ is a radical of the formula (7a), (7b), (7c) or (7d), in particular (7a), in which $(R_{18})_{0-2}$, Y, $Y_1$ and m are as defined and preferred above, $R_{16}$ is methyl or ethyl, in particular methyl, $R_{17}$ is carbamoyl or sulfomethyl, in particular carbamoyl, and $X_2$ is fluorine or chlorine.

In an especially preferred embodiment of the reactive dyes according to the invention, $D_1$ is a radical of the formula (7a), (7b), (7c) or (6j"), in particular (7a), (7b) or (6j"), in which $(R_{18})_{0-2}$, Y, m, $B_2$, $D_2$, $R_{16}$, $R_{17}$ and $X_2$ are as defined and preferred above.

Phenyl $V_1$ and $V_2$ independently of one another are unsubstituted or substituted, for example by $C_1$–$C_4$alkyl, for example methyl or ethyl; $C_1$–$C_4$alkoxy, for example methoxy or ethoxy; $C_2$–$C_4$alkanoylamino; for example acetylamino or propionylamino; carboxyl; carbamoyl; sulfo or halogen, for example chlorine or bromine.

Phenoxy $V_1$ and $V_2$ independently of one another are unsubstituted or substituted in the phenyl ring, for example by $C_1$–$C_4$alkyl, for example methyl or ethyl; $C_1$–$C_4$alkoxy, for example methoxy or ethoxy, $C_2$–$C_4$alkanoylamino; for example acetylamino or propionylamino; carboxyl; carbamoyl; sulfo or halogen, for example chlorine or bromine.

$C_2$–$C_6$alkanoylamino, in particular $C_2$–$C_4$alkanoylamino, $V_1$ and $V_2$ independently of one another are unsubstituted or substituted in the alkyl moiety, for example by sulfo, sulfato, carboxyl, hydroxyl or $C_1$–$C_4$alkoxy, for example methoxy or ethoxy. Examples are acetylamino, hydroxyacetylamino, methoxyacetylamino or propionylamino, in particular acetylamino.

Benzoylamino $V_1$ and $V_2$ independently of one another are unsubstituted or substituted in the phenyl moiety, for example by hydroxyl; sulfo; carboxyl; carbamoyl; halogen, for example chlorine or bromine; $C_1$–$C_4$alkyl, for example methyl or ethyl; or $C_1$–$C_4$alkoxy, for example methoxy or ethoxy.

$V_1$ and $V_2$ are preferably chlorine, bromine, acetylamine or propionylamino, and in particular chlorine.

$V_1$ and $V_2$ are identical or non-identical, preferably identical.

Halogen $X_1$ is, for example, fluorine, chlorine or bromine, and in particular chlorine or fluorine.

$C_1$–$C_4$alkylthio $X_1$ is, for example, methylthio, ethylthio, n-propylthio, isopropylthio or n-butylthio, in particular ethylthio or n-propylthio. The radicals mentioned are unsubstituted or substituted in the alkyl moiety by hydroxyl, carboxyl or sulfo. The substituted radicals are preferred.

Substituted or unsubstituted amino $X_1$ is amino which is unsubstituted or substituted on the N-atom, for example the following radicals:

N-mono- or N,N-di-$C_1$–$C_4$alkylamino, which includes both the unsubstituted radicals and the radicals substituted in the alkyl moiety, for example by $C_1$–$C_4$alkoxy, hydroxyl, sulfo or sulfato; the radicals substituted in the alkyl moiety are preferred;

$C_5$–$C_7$cycloalkylamino, which includes both the unsubstituted radicals and the radicals substituted in the cycloalkyl ring, for example by $C_1$–$C_4$alkyl, in particular methyl; the corresponding cyclohexyl radicals are preferred as such radicals;

phenylamino or N-$C_1$–$C_4$alkyl-N-phenylamino, which includes both the unsubstituted radicals and the radicals substituted in the phenyl ring, for example $C_1$–$C_4$alkyl, $C_1$–$C_4$alkoxy, halogen, carboxyl or sulfo; these radicals are preferably unsubstituted in the phenyl ring or substituted by sulfo.

An N-heterocycle $X_1$ which may contain further heteroatoms is, for example, morpholino or piperidin-1-yl.

$X_1$ is preferably fluorine or chlorine.

$R_1$, $R_2$, $R_3$ and $R_4$ preferably independently of one another are hydrogen or $C_1$–$C_4$alkyl and in particular hydrogen.

$R_5$ and $R_6$ are preferably hydrogen.

Preferably, the reactive dyes according to the invention have the formula (1a)

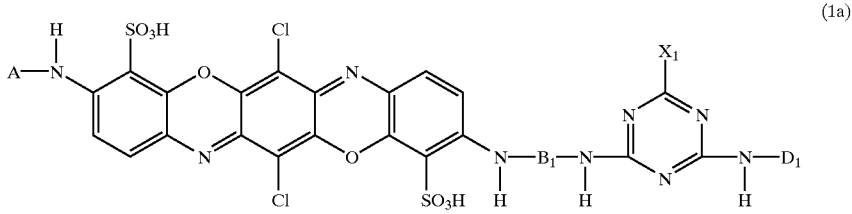
(1a)

in which A, $B_1$, $D_1$ and $X_1$ are as defined and preferred above.

Particularly preferably, the reactive dyes of the formula (1a) according to the invention are those in which

- A is $C_1$–$C_4$alkyl which is unsubstituted or substituted by hydroxyl, sulfo, carboxyl or sulfato, phenyl which is unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen, phenyl-$C_1$–$C_4$alkylene which is unsubstituted or substituted in the phenyl ring by $C_1$–$C_4$alkyl, $C_1$–$C_4$alkoxy, $C_2$–$C_4$alkanoylamino, hydroxyl, carboxyl, sulfo, carbamoyl, ureido or halogen or $C_5$–$C_7$cycloalkyl which is unsubstituted or substituted by $C_1$–$C_4$alkyl, and preferably $C_1$–$C_4$alkyl which is unsubstituted or substituted by hydroxyl, sulfo, carboxyl or sulfato;
- $B_1$ is a $C_2$–$C_{12}$alkylene radical, which can be interrupted by 1, 2 or 3 members —O— and is unsubstituted or substituted by hydroxyl, sulfo, sulfato, cyano or carboxyl, or phenylene which is unsubstituted or substituted by $C_1$–$C_4$alkyl, $C_1$–$C_4$alkoxy, $C_2$–$C_4$alkanoylamino, sulfo, halogen or carboxyl, preferably a $C_2$–$C_{12}$alkylene radical, in particular a $C_2$–$C_6$alkylene radical, which can be interrupted by 1, 2 or 3 members —O— and is unsubstituted or substituted by hydroxyl or sulfato, and especially preferably a radical of the formula —$CH_2$—CH($R_7$)— or —($R_7$)CH—$CH_2$—, in which $R_7$ is $C_1$–$C_4$alkyl;
- $X_1$ is fluorine or chlorine; and
- $D_1$ is a radical of the formula (7) or (6j'), in which $(R_{18})_{0-3}$, Z, $B_2$, $D_2$, $R_9$, $R_{16}$, $R_{17}$, $R_{19}$ and $X_2$ are as defined and preferred above, in particular has the formula (7a), (7b), (7c), (7d) or (6j"), in which $(R_{18})_{0-2}$, Y, $Y_1$, m, $B_2$, $D_2$, $R_{16}$, $R_{17}$ and $X_2$ are as defined and preferred above.

Especially preferably, the reactive dyes of the formula (Ia) according to the invention are those in which

- A is $C_1$–$C_4$alkyl substituted by hydroxyl or sulfato,
- $B_1$ is a radical of the formula —$CH_2$—CH($CH_3$)— or —($CH_3$)CH—$CH_2$—,
- $X_1$ is fluorine or chlorine,
- $D_1$ is a radical of the formula (7a), (7b), (7c) or (6j"), in particular (7a), (7b) or (6j"), in which $(R_{18})_{0-2}$, Y, m, $B_2$, $D_2$, $R_{16}$, $R_{17}$ and $X_2$ are as defined and preferred above.

The present invention also relates to a process for the preparation of the reactive dyes according to the invention, which comprises reacting a compound of the formula (8)

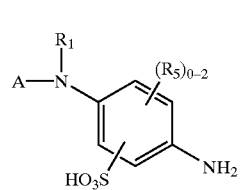
(8)

with a compound of the formula (9)

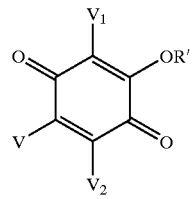
(9)

to give a compound of the formula (10)

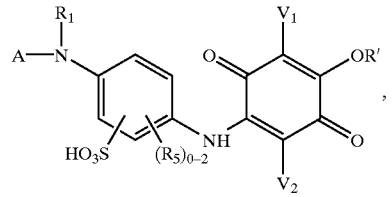
(10)

reacting the compound of the formula (10) with a compound of the formula (11)

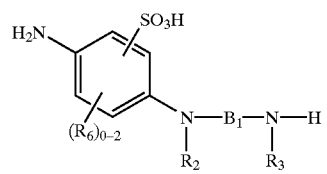
(11)

to give a compound of the formula (12)

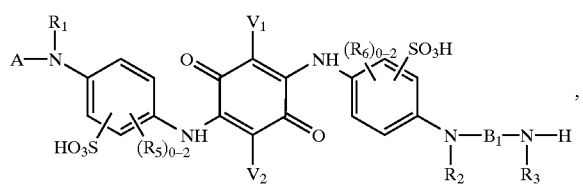
(12)

cyclizing the compound of the formula (12) to give a compound of the formula (13)

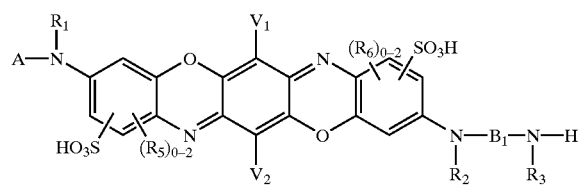
(13)

and subjecting the compound of the formula (13) to a condensation reaction in any desired sequence with 2,4,6-trihalogeno-s-triazine and a compound of the formula (14)

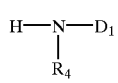
(14)

to give a compound of the formula (15)

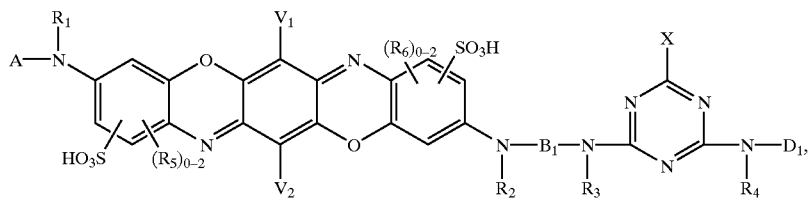
(15)

in which $R_1$, $R_2$, $R_3$, $R_4$, $(R_5)_{0-2}$, $(R_6)_{0-2}$, A, $B_1$, $D_1$, $V_1$ and $V_2$ are as defined above, R' is $C_1$–$C_4$alkyl, V is chorine or bromine, in particular chlorine, and X is halogen, and in particular fluorine or chlorine.

The halogen atom X in the compound of the formula (15) can be replaced by subjecting the compound of the formula (15) to a condensation reaction with a compound of the formula (16)

$X_1$—H          (16), in which $X_1$ is as defined above, with the exception of halogen.

Condensation reactions of dyes containing amino groups with 2,4,6-trihalogeno-s-triazine are known and are described, for example, in EP-A-0 260 227 and U.S. Pat. No. 4,841,049.

The compounds of the formula (8), (9), (11) and (14) are known or can be obtained in a manner known per se.

If appropriate, the end product can also be subjected to a conversion reaction. Such a conversion reaction is, for example, the conversion of a vinylatable reactive group contained in $D_1$ into its vinyl form by treatment with dilute sodium hydroxide solution, for example the conversion of the β-sulfatoethylsulfonyl or β-chloroethylsulfonyl group into the vinylsulfonyl radical. Such reactions are known per se.

The compounds of the formula (1) according to the invention are suitable as dyes for dyeing and printing widely varying materials, such as fibre materials containing hydroxyl groups or containing nitrogen. Examples of nitrogen-containing fibre materials are silk, leather, wool, polyamide fibres and polyurethanes. The dyes according to the invention are particularly suitable for dyeing and printing all types of cellulosic fibre materials. Such cellulosic fibre materials are, for example, the natural cellulose fibres, such as cotton, linen and hemp, as well as pulp and regenerated cellulose, preferably cotton. The dyes according to the invention are also suitable for dyeing or printing cellulosic blend fabrics, for example mixtures of cotton and polyamide fibres or, in particular, cotton/polyester blends.

The dyes according to the invention can be applied to the fibre material and fixed on the fibre in various ways, in particular in the form of aqueous dye solutions and printing pastes. They are suitable both for the exhaust method and for dyeing by the pad-dyeing method, in which the goods are impregnated with aqueous dye solutions, which may contain salts, and the dyes are fixed after an alkali treatment or in the presence of alkali, if appropriate under the action of heat or by storage at room temperature for several hours. After the fixing, the dyeings or prints are rinsed thoroughly with cold and hot water, if appropriate with the addition of an agent which has a dispersing action and promotes diffusion of the non-fixed portions.

The dyes according to the invention are distinguished by a high reactivity, good fixing capacity and a very good build-up capacity. They can therefore be used by the exhaust dyeing method at low dyeing temperatures and require only short steaming times in the pad-steam process. The degrees of fixing are high and the non-fixed portions can easily be washed out, the difference between the degree of exhaustion and the degree of fixing being remarkably small, i.e. the soaping loss is very low. The dyes according to the invention are also particularly suitable for printing, in particular on cotton, but likewise also for printing nitrogen-containing fibres, for example wool or silk or blend fabrics which contain wool or silk.

The dyeings and prints produced with the dyes according to the invention have a high colour strength and a high fibre-dye bond stability both in the acid and in the alkaline range, and furthermore good light fastness properties and very good wet fastness properties, such as fastnesses to washing, water, seawater, cross dyeing and perspiration, as well as a good fastness to pleating, fastness to ironing and fastness to rubbing.

The following examples serve to illustrate the invention. Temperatures are in degrees Celsius, parts are parts by weight and the percentage data are percentages by weight, unless noted otherwise. Parts by weight bear the same relation to parts by volume as the kilogram to the litre.

EXAMPLE 1

24.2 parts of 2,3,5-trichloro-6-methoxy-1,4-benzoquinone are stirred under reflux together with 23.2 parts of 5-Amino-2-(2-hydroxyethylamino)benzenesulfonic acid and 9 parts of anhydrous sodium acetate in 2500 parts of methanol for 3 hours. 2500 parts of water are added to the reaction mixture and the precipitate formed is filtered off, washed with water and dried. 24 parts of an orange-coloured powder which, in the form of the free acid, has the formula (101)

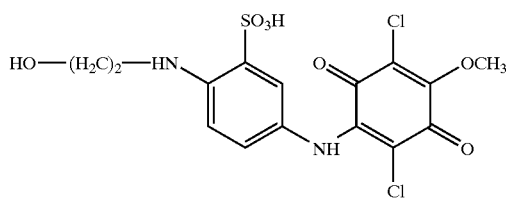

(101)

are obtained.

EXAMPLE 2

43.7 parts of the powder obtained according to Example 1 are stirred with 24.5 parts of 5-amino-2-(2-aminopropylamino)benzenesulfonic acid in 500 parts of water, a pH of 8 being maintained with aqueous sodium hydroxide solution during the reaction. When the reaction has ended the brown precipitate formed is filtered off, washed with water and dried in vacuo. A compound which, in the form of the free acid, has the formula (102)

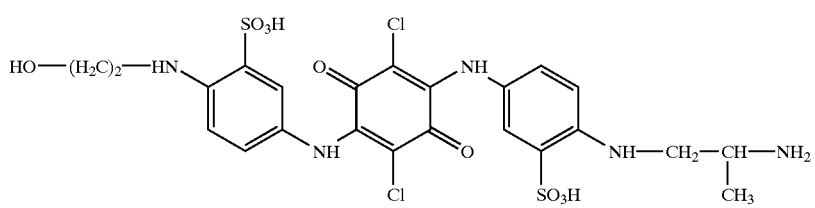

(102)

is obtained.

EXAMPLE 3

65 parts of the finely ground compound from Example 2 are introduced in portions into 300 parts of 25% oleum. 55 parts of potassium peroxodisufate are added to the reaction mixture at 0° C. and the mixture is stirred at 0° C. for a further 3 hours. When the reaction has ended, the reaction mass is poured onto ice and partly neutralized with concentrated sodium hydroxide solution. The blue precipitate formed is filtered off, washed with water and dried in vacuo. A compound which, in the form of a free acid, has the formula (103)

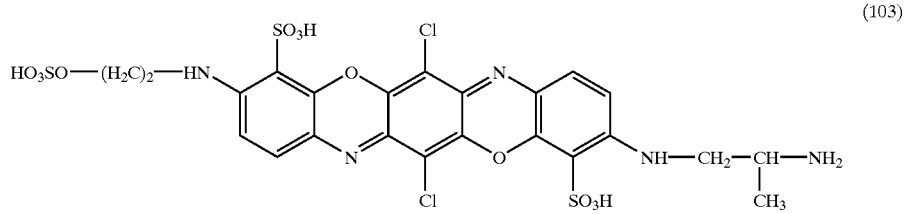

(103)

is obtained.

EXAMPLE 4

28.1 parts of 2-(4-aminophenylsulfonyl)ethyl hydrogen sulfate are added in portions to a suspension prepared from 19 parts of trichlorotriazine, 50 parts of an ice/water mixture and 5 parts of disodium hydrogen phosphate. The pH here is kept, at 4 with dilute aqueous sodium hydroxide solution until the reaction has ended, and thereafter is increased to and kept at 6.5. A heated solution of 72.6 parts of the compound according to Example 3 and 2.5 parts of lithium hydroxide in 500 parts of water is rapidly added dropwise to this solution. The temperature here is kept between 25 and 30° C. and the pH is kept between 9.5 and 10. The reaction mixture is stirred under these conditions for a further hour, neutralized with dilute hydrochloric acid, dialysed and evaporated in vacuo. A compound which, in the form of the free acid, has the formula (104)

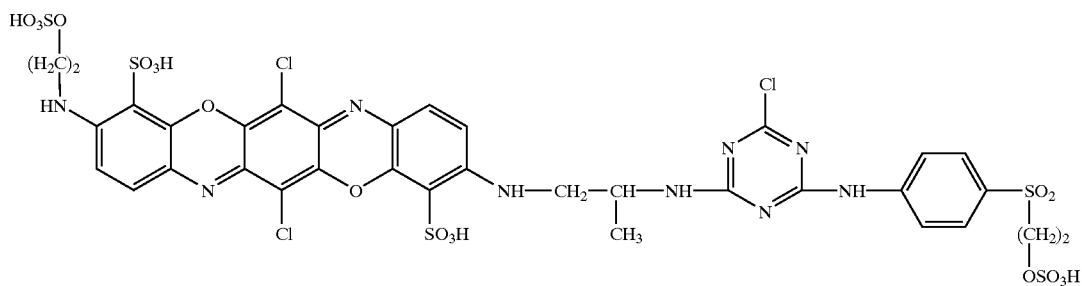
(104)

and dyes cotton in brilliant blue shades with good allround properties is obtained.

EXAMPLES 5 TO 28

The procedure described in Example 4 is repeated, except that an equimolar amount of an amine of the formula $D_x$—$NH_2$, in which $D_x$ is in each case as defined in Table 1, is used in place of 28.1 parts of 2-(4-aminophenylsulfonyl) ethyl hydrogen sulfate. A compound which, in the form of the free acid, has the general formula (105)

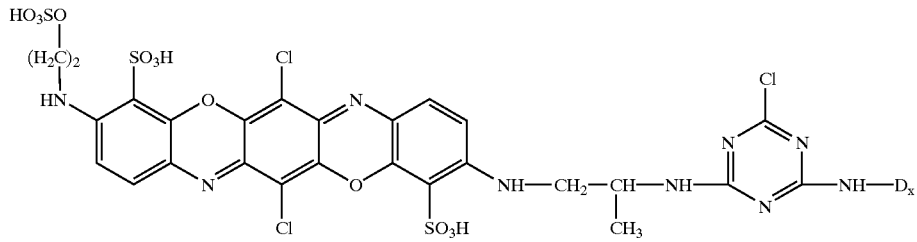
(105)

in which $D_x$ in each case is as defined in Table 1, is obtained. The dyes dye cotton in brilliant blue shades with good allround properties.

TABLE 1

| Example | Amine $D_x$-$NH_2$ | $D_x$ |
|---|---|---|
| 5 (30) | $D_1$-$NH_2$ | $D_1$ = —⟨phenyl⟩—$SO_2$—$CH_2$—$CH_2$—$OSO_3H$ (meta) |
| 6 (31) | $D_2$-$NH_2$ | $D_2$ = —⟨phenyl with $HO_3S$⟩—$SO_2$—$CH_2$—$CH_2$—$OSO_3H$ |
| 7 (32) | $D_3$-$NH_2$ | $D_3$ = —⟨phenyl with $HO_3S$, $CH_3$⟩—$SO_2$—$CH_2$—$CH_2$—$OSO_3H$ |

TABLE 1-continued

| Example | Amine $D_x$-$NH_2$ | $D_x$ |
| --- | --- | --- |
| 8 (33) | $D_4$-$NH_2$ | $D_4 =$ 4-sulfo-3-(2,3-dibromopropanoylamino)phenyl: a benzene ring with $HO_3S$ at one position and $-HN-CO-CHBr-CH_2Br$ substituent |
| 9 (34) | $D_5$-$NH_2$ | $D_5 =$ phenyl—$CONH$—$(CH_2)_2$—$SO_2$—$(CH_2)_2$—$Cl$ |
| 10 (35) | $D_6$-$NH_2$ | $D_6 =$ (sulfophenyl with $HO_3S$)—$CONH$—$(CH_2)_2$—$SO_2$—$(CH_2)_2$—$Cl$ |
| 11 (36) | $D_7$-$NH_2$ | $D_7 =$ phenyl—$CONH$—$(CH_2)_2$—$SO_2$—$(CH_2)_2$—$OSO_3H$ |
| 12 (37) | $D_8$-$NH_2$ | $D_8 =$ (sulfophenyl with $HO_3S$)—$CONH$—$(CH_2)_2$—$SO_2$—$(CH_2)_2$—$OSO_3H$ |
| 13 (38) | $D_9$-$NH_2$ | $D_9 =$ phenyl(meta)—$CONH$—$(CH_2)_2$—$SO_2$—$(CH_2)_2$—$OSO_3H$ |
| 14 (39) | $D_{10}$-$NH_2$ | $D_{10} =$ (sulfophenyl with $HO_3S$)—$CONH$—$(CH_2)_2$—$SO_2$—$(CH_2)_2$—$OSO_3H$ |
| 15 (40) | $D_{11}$-$NH_2$ | $D_{11} =$ (sulfophenyl with $HO_3S$)—$HNCO$—$(CH_2)_3$—$SO_2$—$(CH_2)_3$—$OSO_3H$ |
| 16 (41) | $D_{12}$-$NH_2$ | $D_{12} =$ (methoxyphenyl with $OCH_3$)—$SO_2$—$CH_2$—$CH_2$—$OSO_3H$ |
| 17 (42) | $D_{13}$-$NH_2$ | $D_{13} =$ (methoxy/methyl-substituted phenyl with $OCH_3$ and $CH_3$)—$SO_2$—$CH_2$—$CH_2$—$OSO_3H$ |

TABLE 1-continued
| Example | Amine $D_x$-NH$_2$ | $D_x$ |
|---|---|---|
| 18 (43) | $D_{14}$-NH$_2$ | 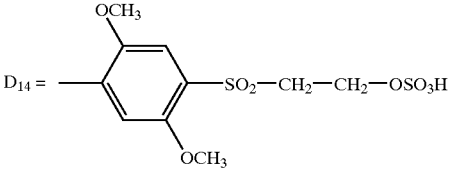 |
| 19 (44) | $D_{15}$-NH$_2$ | 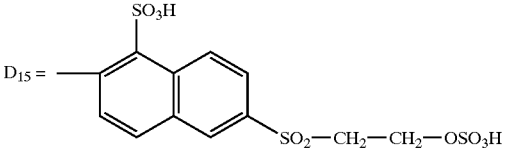 |
| 20 (45) | $D_{16}$-NH$_2$ | 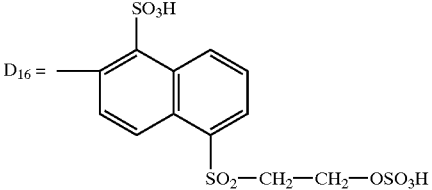 |
| 21 (46) | $D_{17}$-NH$_2$ | 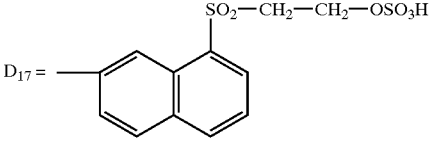 |
| 22 (47) | $D_{18}$-NH$_2$ | 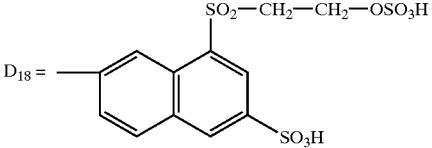 |
| 23 (48) | $D_{19}$-NH$_2$ | 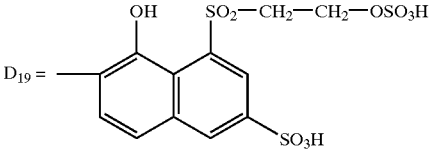 |
| 24 (49) | $D_{20}$-NH$_2$ | 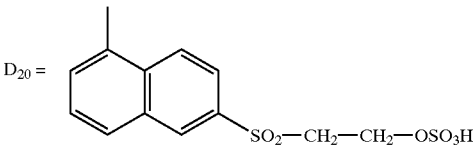 |
| 25 (50) | $D_{21}$-NH$_2$ | 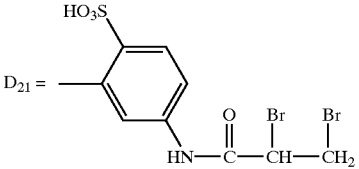 |

TABLE 1-continued

| Example | Amine $D_x$-$NH_2$ | $D_x$ |
|---|---|---|
| 26 (51) | $D_{22}$-$NH_2$ | 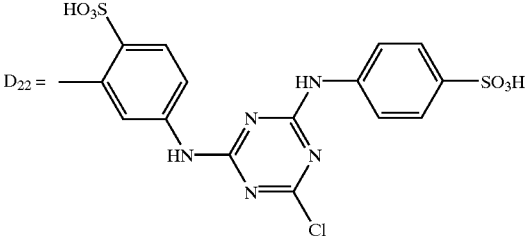 |
| 27 (52) | $D_{23}$-$NH_2$ | 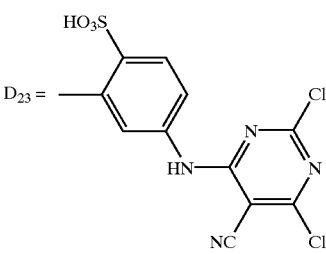 |
| 28 (53) | $D_{24}$-$NH_2$ | 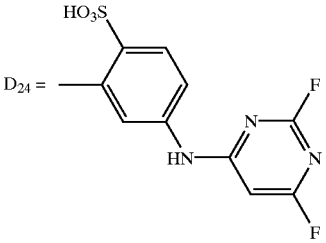 |

EXAMPLE 29

13.3 parts of trifluorotriazine are added dropwise to 28.1 parts of 2-(4-aminophenylsulfonyl)ethyl hydrogen sulfate in 300 parts of water at 0° C., the pH here being kept at 6 with dilute aqueous sodium hydroxide solution. A solution of 72.6 parts of the compound according to Example 3 and 2.5 parts of lithium hydroxide in 500 parts of water is added to this solution. The temperature here is kept between 25 and 30° C. and the pH is kept between 9.5 and 10. The reaction mixture is stirred under these conditions for a further hour, neutralized with dilute hydrochloric acid, dialysed and evaporated in vacuo. A compound which, in the form of the free acid, has the formula (106)

and dyes cotton in brilliant blue shades with good allround properties is obtained.

EXAMPLES 30 TO 53

The procedure described in Example 29 is repeated, except that an equimolar amount of an amine of the formula $D_x$—$NH_2$, in which $D_x$ in each case is as defined in Table 1, is used in place of 28.1 parts of 2-(4-aminophenylsulfonyl) ethyl hydrogen sulfate. A compound which, in the form of the free acid, has the general formula (107)

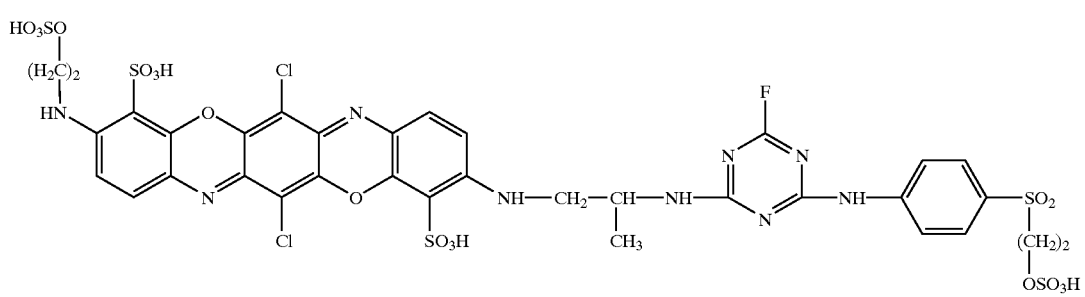

(106)

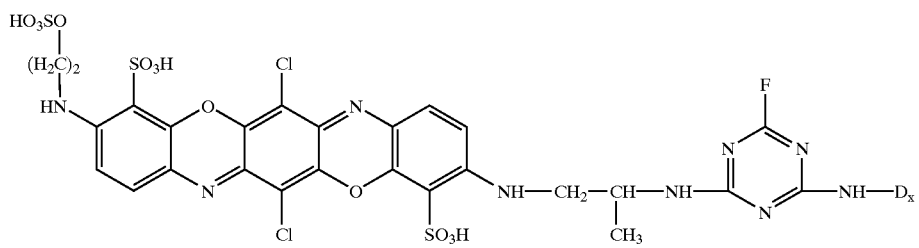

in which $D_x$ in each case is as defined in Table 1, is obtained. The dyes dye cotton in brilliant blue shades with good allround properties.

EXAMPLES 54 TO 71

The procedure described in Examples 2, 3 and 4 is repeated, except that an equimolar amount of an amine of the formula

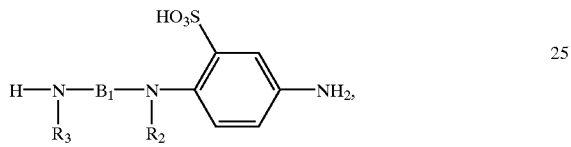

in which the radical

in each case is as defined in Table 2, column 2 is used in place of 24.5 parts of 5-amino-2-(2-aminopropylamino) benzenesulfonic acid. A compound which, in the form of the free acid, has the general formula (108)

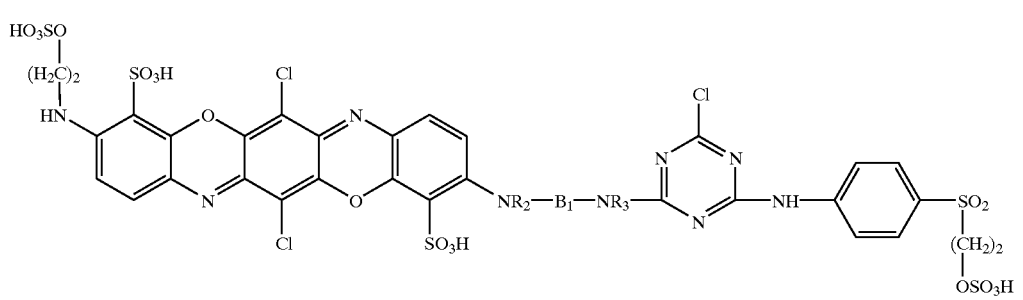

in which the radical

in each case is as defined in Table 2, column 3, is obtained. The dyes dye cofton in brilliant blue shades with good allround properties.

TABLE 2
| Example | —N(R₂)—B₁—N(R₃)—H | —N(R₂)—B₁—N(R₃)— |
|---|---|---|
| 54 (72) | —NH—CH₂—CH₂—NH₂ | —NH—CH₂—CH₂—NH— |
| 55 (73) | —NH—CH₂—CH₂—CH₂—NH₂ | —NH—CH₂—CH₂—CH₂—NH— |
| 56 (74) | —NH—CH₂—CH₂—NH(CH₃) | —NH—CH₂—CH₂—N(CH₃)— |
| 57 (75) | —N(CH₃)—CH₂—CH₂—NH(CH₃) | —N(CH₃)—CH₂—CH₂—N(CH₃)— |
| 58 (76) | —NH—(CH₂)₃—O—(CH₂)₄—O—(CH₂)₃—NH₂ | —NH—(CH₂)₃—O—(CH₂)₄—O—(CH₂)₃—NH— |
| 59 (77) | —NH—(CH₂)₂—O—(CH₂)₂—O—(CH₂)₂—NH₂ | —NH—(CH₂)₂—O—(CH₂)₂—O—(CH₂)₂—NH— |
| 60 (78) | —NH—CH₂—CH₂—NH(CH₂CH₃) | —NH—CH₂—CH₂—N(CH₂CH₃)— |
| 61 (79) | 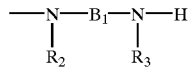 | 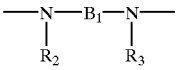 |
| 62 (80) | 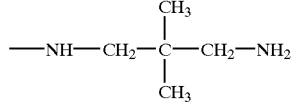 | 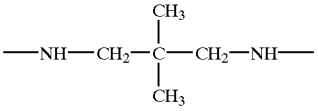 |
| 63 (81) | 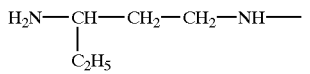 | 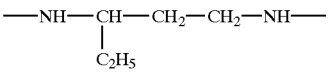 |
| 64 (82) | 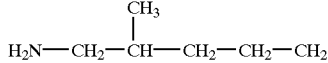 | 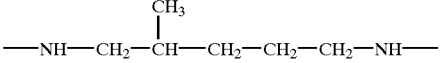 |
| 65 (83) | 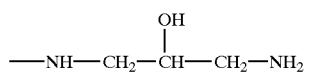 | 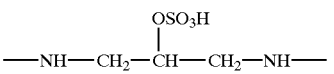 |
| 66 (84) | 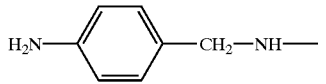 | 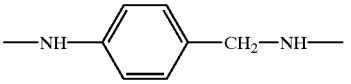 |
| 67 (85) | 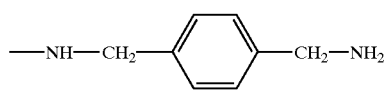 |  |
| 68 (86) | 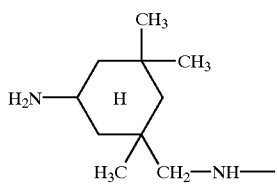 | 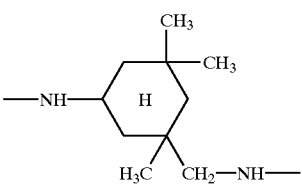 |
| 69 (87) | 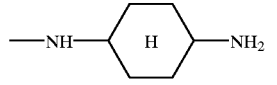 |  |
| 70 (88) | 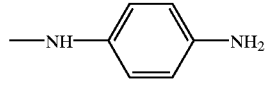 | 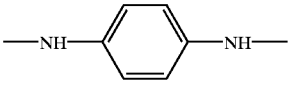 |
| 71 (89) | 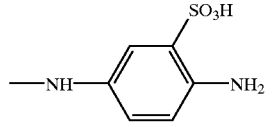 | 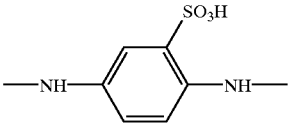 |

EXAMPLES 72 TO 89

The procedure described in Examples 2, 3 and 29 is repeated, except that an equimolar amount of an amine of the formula

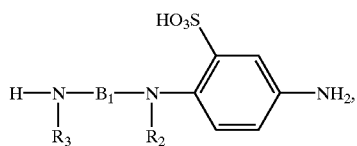

in which the radical

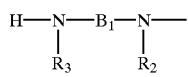

in each case is as defined in Table 2, column 2 is used in place of 24.5 parts of 5-amino-2-(2-aminopropylamino)benzenesulfonic acid. A compound which, in the form of the free acid, has the general formula (109)

EXAMPLES 90 TO 99

The procedure described in Examples 1 to 4 is repeated, except that an equimolar amount of an amine of the formula

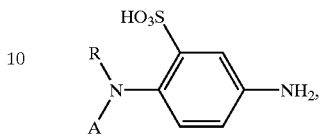

in which the radical —NRA in each case is as defined in Table 3, column 2, is used in place of 23.2 parts of 5-amino-2-(2-hydroxyethylamino)benzenesulfonic acid. A compound which, in the form of the free acid, has the general formula (110)

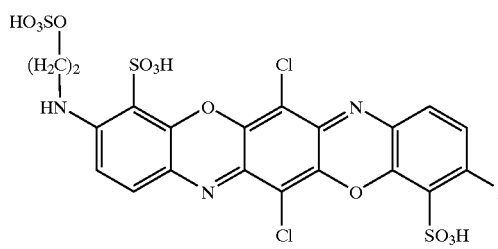

(109)

in which the radical

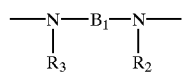

in each case is as defined in Table 2, column 3, is obtained. The dyes dye cotton in brilliant blue shades with good allround properties.

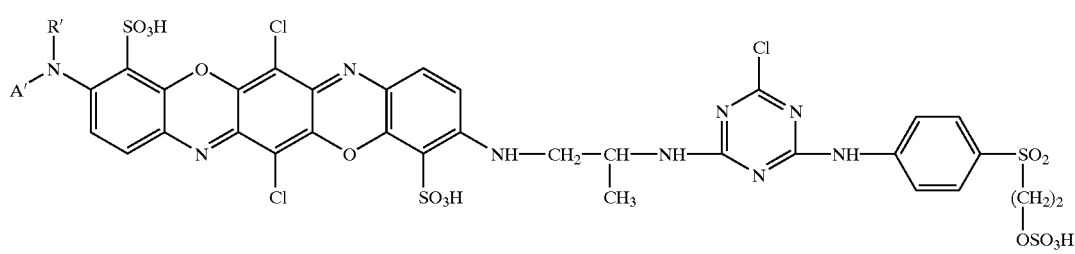

(110)

in which —NR'A' in each case is as defined in Table 3, column 3, is obtained. The dyes dye cotton in brilliant blue shades with good allround properties.

TABLE 3

| Example | —NRA | —NR'A' |
|---|---|---|
| 90 (100) | —NH₂ | —NH₂ |
| 91 (101) | —N(CH₃)₂ | —N(CH₃)₂ |
| 92 (102) | —NH—CH₂—CH₃ | —NH—CH₂—CH₃ |
| 93 (103) | —NH—(CH₂)₃—OH | —NH—(CH₂)₃—OSO₃H |
| 94 (104) | —NH—CH₂—CH(CH₃)—OH | —NH—CH₂—CH(CH₃)—OSO₃H |
| 95 (105) | —NH—CH₂—CH₂—O—CH₂—CH₂—OH | —NH—CH₂—CH₂—O—CH₂—CH₂—OSO₃H |
| 96 (106) | —N(CH₂—CH₃)(CH₂—CH₂—OH) | —N(CH₂—CH₃)(CH₂—CH₂—OSO₃H) |
| 97 (107) | —N(CH₂—CH₂—OH)₂ | —N(CH₂—CH₂—OSO₃H)₂ |
| 98 (108) | —NH—CH₂—CH₂—SO₃H | —NH—CH₂—CH₂—SO₃H |
| 99 (109) | —N(CH₃)—CH₂—CH₂—SO₃H | —N(CH₃)—CH₂—CH₂—SO₃H |

EXAMPLES 100 TO 109

The procedure described in Examples 1, 2, 3 and 29 is repeated, except that an equimolar amount of an amine of the formula

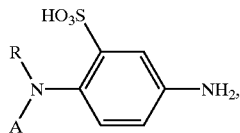

in which the radical —NRA in each case is as defined in Table 3, column 2, is used in place of 23.2 parts of 5-amino-2-(2-hydroxyethylamino)benzenesulfonic acid. A compound which, in the form of the free acid, has the general formula (111)

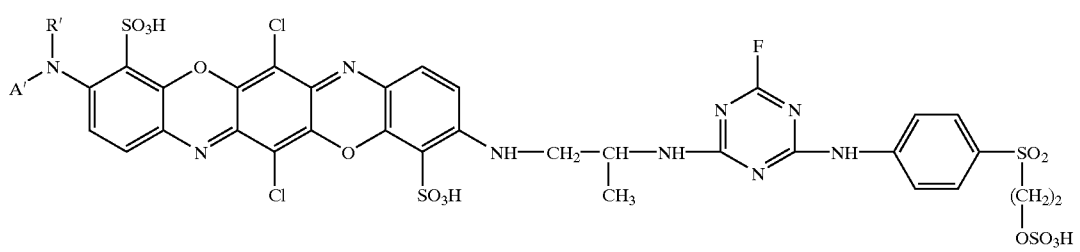

(111)

in which —NR'A' in each case is as defined in Table 3, column 3, is obtained. The dyes dye cotton in brilliant blue shades with good allround properties.

EXAMPLE 110

13.3 parts of trifluorotriazine are added dropwise to 28.1 parts of 2-(4-aminophenylsulfonyl)ethyl hydrogen sulfate in 300 parts of water at 0° C., the pH here being kept at 6 with dilute aqueous sodium hydroxide solution. 21.1 parts of 1-(2-amino-ethyl)-6-hydroxy-4-methyl-2-oxo-1,2-dihydro-pyridine-3-carboxamide are added to this reaction mixture. The pH is increased to 8.5 with aqueous sodium hydroxide solution and kept at this value until the condensation reaction has ended. The mixture is heated to 30° C., the pH is increased to 11 and the reaction mixture is stirred for 15 minutes and neutralized with dilute hydrochloric acid. The reaction mixture comprises the compound of the formula (112)

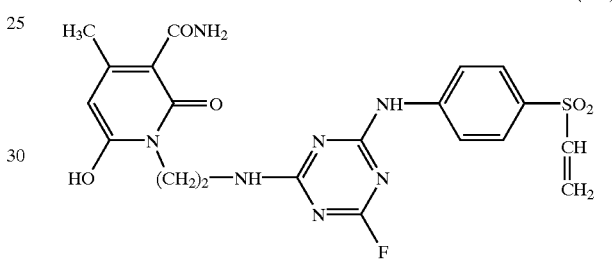

(112)

EXAMPLE 111

26.8 parts of 1,3-phenylenediamine-4,6-disulfonic acid are dissolved in 300 parts of water at pH 6, the solution is cooled to 0° C. and 18.4 parts of trichlorotriazine and a little wetting agent are added. The mixture is stirred at 0° C. and a pH of 6 until the condensation reaction has largely ended, 6.9 parts of sodium nitrite, 150 parts of ice and 29 parts of concentrated hydrochloric acid are then added and the mixture is stirred for a further two hours. The excess nitrite is destroyed with a little sulfamic acid and the reaction mixture obtained according to Example 110 is added dropwise in the course of 30 minutes. The pH is then increased slowly to 6.5 and is kept at 6.5 for two hours. 100 parts of potassium chloride are added to the reaction mixture and the precipitate formed is filtered off, washed with saturated potassium chloride solution and dried. A compound which, in the form of the free acid, has the formula (113)

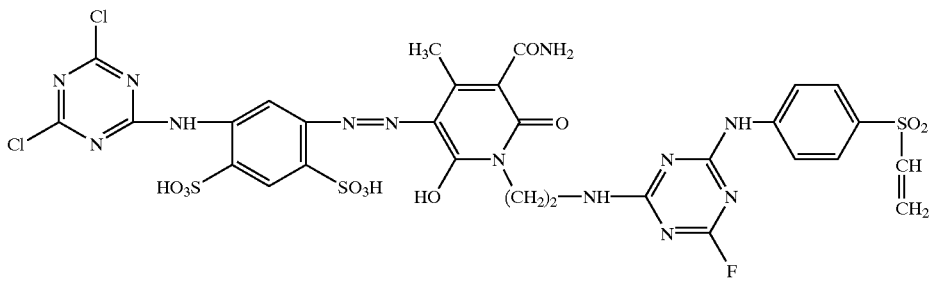

(113)

EXAMPLE 112

72.7 parts of the compound according to Example 3 are dissolved in 500 parts of water with 2.5 parts of lithium hydroxide at 60° C. and the solution is rapidly added to a suspension of 91.7 parts of the compound prepared according to Example 111 in 800 parts of water. The pH is kept between 9 and 9.5 by addition of aqueous sodium hydroxide solution and the temperature is kept at 30° C. When the condensation reaction has ended, the product is salted out with 260 parts of potassium chloride, filtered off, washed with saturated potassium chloride solution and dried. A compound which, in the form of the free acid, has the formula (114)

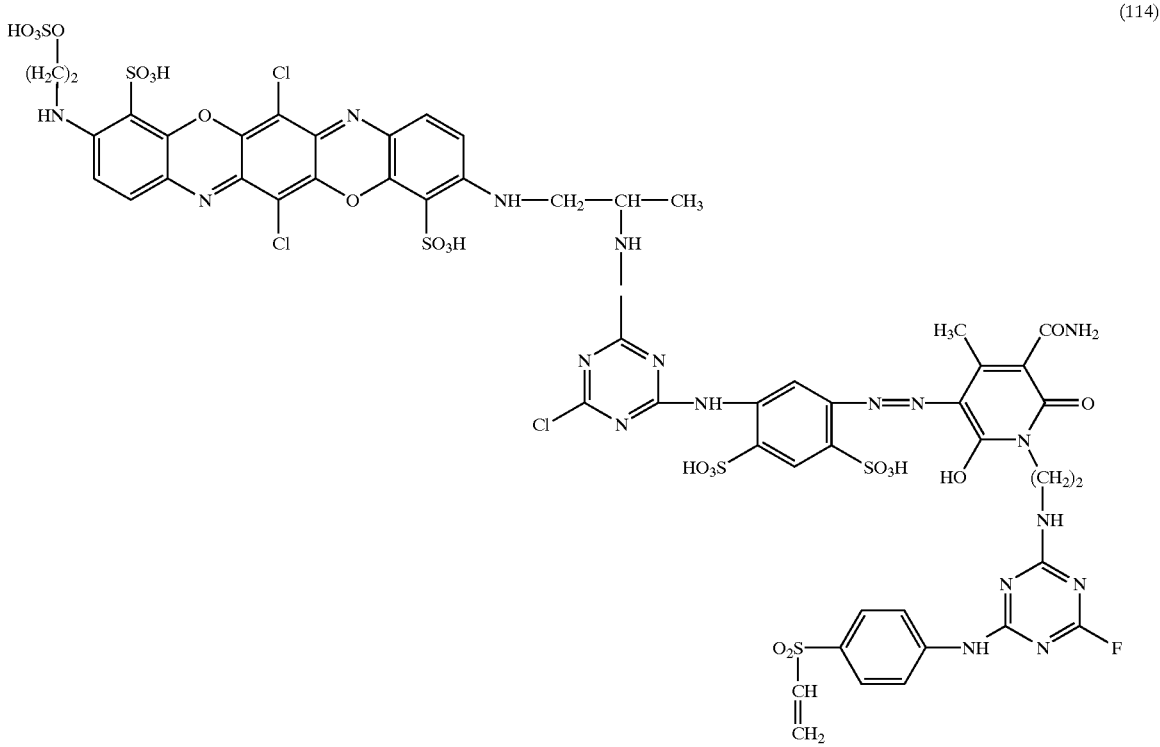

(114)

and dyes cotton in brilliant green shades with good allround properties is obtained.

The following compounds which, in the form of the free acid, have the formulae given in table 4 can be prepared in a manner analogous to that described in Examples 110, 111 and 112. The dyes dye cotton in brilliant green shades with good allround properties.

TABLE 4

Ex. 113

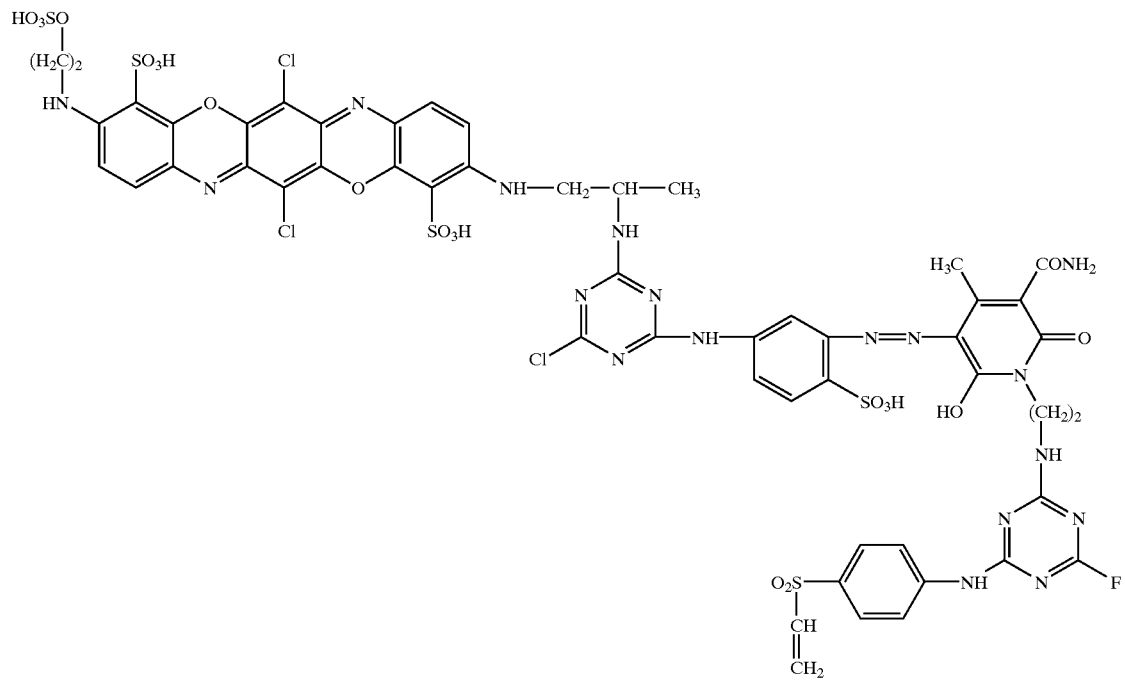

(115)

Ex. 114

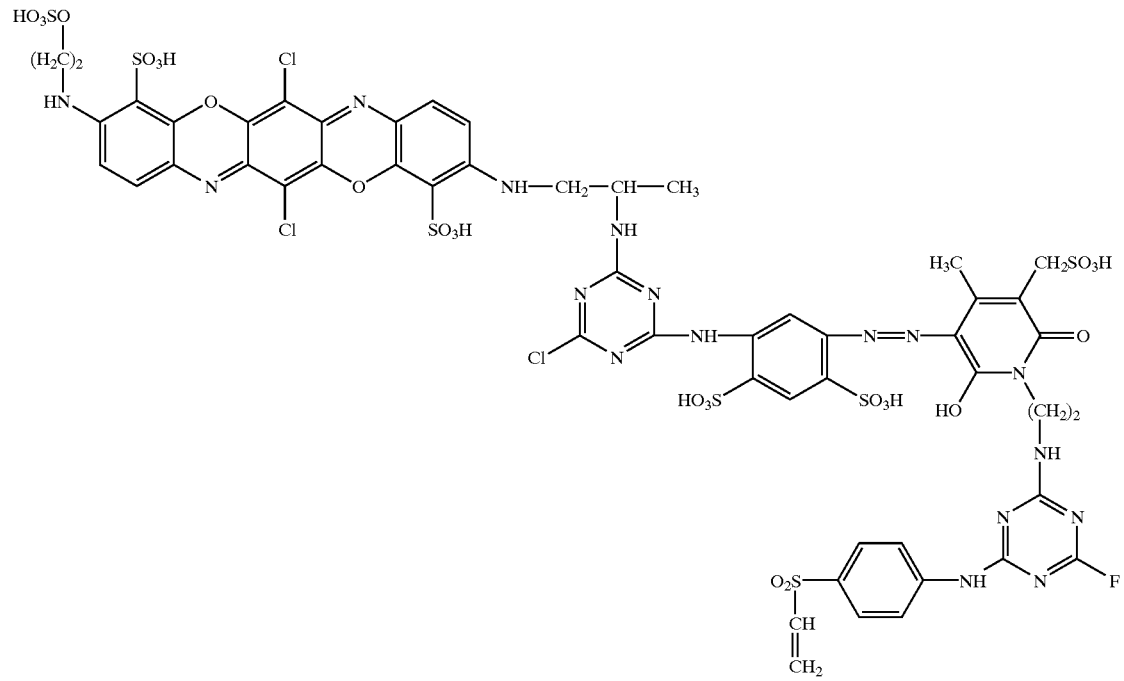

(116)

Dyeing instructions 1: 2 parts of the dye obtained according to Example 4 are dissolved in 400 parts of water; 1500 parts of a solution which comprises 53 g of sodium chloride per litre are added. 100 parts of cotton fabric are introduced into this dyebath at 40° C. After 45 minutes, 100 parts of a solution which comprises 16 g of sodium hydroxide and 20 g of calcined sodium carbonate per litre are added. The temperature of the dyebath is kept at 40° C. for a further 45 minutes. Thereafter, the dyed goods are rinsed, soaped at the boil with a nonionic detergent for a quarter of an hour, rinsed again and dried.

Dyeing instructions II: 2 parts of the reactive dye obtained according to Example 4 are dissolved in 400 parts of water; 1500 parts of a solution which comprises 53 g of sodium chloride per litre are added. 100 parts of cotton fabric are introduced into this dyebath at 35° C. After 20 minutes, 100 parts of a solution which comprises 16 g of sodium hydroxide and 20 g of calcined sodium carbonate per litre are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a nonionic detergent for a quarter of an hour, rinsed again and dried.

Dyeing instructions III: 8 parts of the reactive dye obtained according to Example 4 are dissolved in 400 parts of water; 1400 parts of a solution which comprises 100 g of sodium sulfate per litre are added. 100 parts of cotton fabric are introduced into this dyebath at 25° C. After 10 minutes, 200 parts of a solution which comprises 150 g of trisodium phosphate per litre are added. Thereafter, the temperature of the dyebath is increased to 60° C. in the course of 10 minutes. The temperature is kept at 60° C. for a further 90 minutes. Thereafter, the goods are rinsed, soaped at the boil with a nonionic detergent for a quarter of an hour, rinsed again and dried.

Dyeing instructions IV: 4 parts of the reactive dye obtained according to Example 4 are dissolved in 50 parts of water. 50 parts of a solution which comprises 5 g of sodium hydroxide and 20 g of calcined sodium carbonate per litre are added. A cotton fabric is padded with the resulting solution such that it increases by 70% of its weight, and is then wound onto a roll. The cotton fabric is stored in this manner at room temperature for 3 hours. The dyed goods are then rinsed, soaked at the boil with a nonionic detergent for a quarter of an hour, rinsed again and dried.

Dyeing instructions V: 6 parts of the reactive dye obtained according to Example 4 are dissolved in 50 parts of water. 50 parts of a solution which comprises 16 g of sodium hydroxide and 0.04 litre of water-glass (38°bé) per litre are added. A cotton fabric is padded with the resulting solution such that it increases by 70% of its weight, and is then wound onto a roll. The cotton fabric is stored in this manner at room temperature for 10 hours. The dyed goods are then rinsed, soaped at the boil with a nonionic detergent for a quarter of an hour, rinsed again and dried.

Dyeing instructions VI: 2 parts of the reactive dye obtained according to Example 4 are dissolved in 100 parts of water with the addition of 0.5 part of sodium m-nitrobenzenesulfonate. A cotton fabric is impregnated with the resulting solution such that it increases by 75% of its weight, and is then dried. The fabric is then impregnated with a solution, warmed to 20° C., which comprises 4 g sodium hydroxide and 300 of sodium chloride per litre and squeezed off to a weight increase of 75%, and the dyeing is then steamed at 100 to 102° C. for 30 seconds, rinsed, soaped for a quarter of an hour in a 0.3% boiling solution of a nonionic detergent, rinsed and dried.

Printing instructions I: 3 parts of the reactive dye obtained according to Example 4 are sprinkled with high-speed stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the printed material obtained is steamed in saturated steam at 102° C. for 2 minutes. The printed fabric is then rinsed, soaped at the boil and rinsed again, if appropriate, and then dried.

Printing instructions II: 5 parts of the reactive dye obtained according to Example 4 are sprinkled with high-speed stirring into 100 parts of a stock thickener comprising 50 parts of 5% sodium alginate thickener, 36.5 parts of water, 10 parts of urea, 1 part of m sodium m-nitrobenzene sulfonate and 2.5 parts of sodium bicarbonate. A cotton fabric is printed with the printing paste thus obtained, the stability of which meets the technical requirements, and the resulting printed material is steamed in saturated steam at 102° C. for 8 minutes. The printed fabric is then rinsed, soaped at the boil and rinsed again, if appropriate, and then dried.

What is claimed is:

1. A reactive dye of the formula (1)

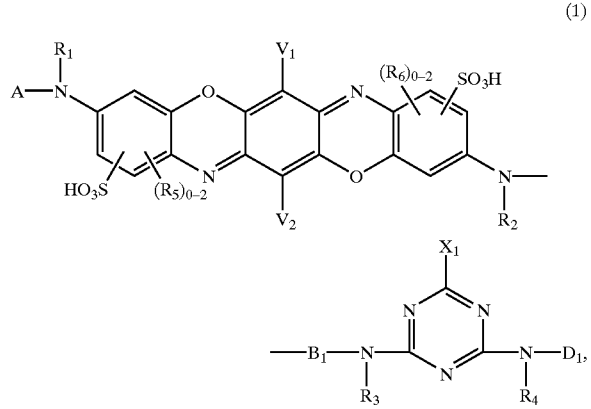

in which $R_1$, $R_2$, $R_3$ and $R_4$ independently of one another are hydrogen or substituted or unsubstituted $C_1$–$C_4$alkyl, $(R_5)_{0-2}$ and $(R_6)0$-2 independently of one another are 0 to 2 identical or different substituents selected from the group consisting of $C_1$–$C_4$alkyl, $C_1$–$C_4$alkoxy, $C_2$–$C_4$alkanoylamino, halogen, carboxyl, sulfo, carbamoyl, N-$C_1$–$C_4$alkylcarbamoyl, N,N-di-$C_1$–$C_4$alkylcarbamoyl, $C_1$–$C_4$alkylsulfonyl, sulfamoyl, N-$C_1$–$C_4$alkylsulfamoyl and N,N-di-$C_1$–$C_4$alkylsulfamoyl, A is hydrogen or $C_1$–$C_4$alkyl which is unsubstituted or substituted by hydroxyl, sulfo, carboxyl or sulfato; phenyl or naphthyl which are unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen; phenyl-$C_1$–$C_4$alkylene which is unsubstituted or substituted in the phenyl ring by $C_1$–$C_4$alkyl, $C_1$–$C_4$alkoxy, $C_2$–$C_4$alkanoylamino, hydroxyl, carboxyl, sulfo, carbamoyl, ureido or halogen; or $C_5$–$C_7$cycloalkyl which is unsubstituted or substituted by $C_1$–$C_4$alkyl, $B_1$ is a $C_2$–$C_{12}$alkylene radical, which can be interrupted by 1, 2 or 3 members selected from the group consisting of —NH—, —N($CH_3$)— or —O— and is unsubstituted or substituted by hydroxyl, sulfo, sulfato, cyano or carboxyl; a $C_5$–$C_9$-cycloalkylene radical, $C_1$–$C_6$alkylenephenylene radical or phenylene radical which are unsubstituted or substituted by $C_1$–$C_4$alkyl, $C_1$–$C_4$alkoxy, $C_2$–$C_4$alkanoylamino, sulfo, halogen or carboxyl; or the radical of the formula

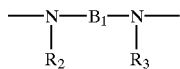

is a radical of the formula

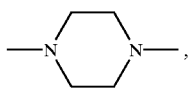

$D_1$ is a mono- or disazo radical of the formula (4) or (5)

$$D^*-N=N-(M-N=N)_u-K- \qquad (4)$$

or $$-D^*-N=N-(M-N=N)_u-K \qquad (5),$$

in which
- $D^*$ is the radical of a diazo component of the benzene or naphthalene series,
- M is the radical of a middle component of the benzene or naphthalene series,
- K is the radical of a coupling component of the benzene, naphthalene, pyrazolone, 6-hydroxypyrid-2-one or acetoacetic acid amide series,
- and u is the number 0 or 1, where $D^*$, M and K can furthermore carry substituents customary in azo dyes,
- $V_1$ and $V_2$ independently of one another are hydrogen, halogen, $C_1$–$C_4$alkyl, $C_1$–$C_4$alkoxy, or substituted or unsubstituted phenyl, phenoxy, $C_2$–$C_6$alkanoylamino or benzoylamino and $X_1$ is fluorine or chlorine.

2. A reactive dye according to claim 1, in which $R_1$, $R_2$, $R_3$ and $R_4$ independently of one another are hydrogen or $C_1$–$C_4$alkyl.

3. A reactive dye according to claim 1, in which A is $C_1$–$C_4$alkyl, which is unsubstituted or substituted by hydroxyl, sulfo, carboxyl or sulfato; phenyl or naphthyl which are unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen; phenyl-$C_1$–$C_4$alkylene which is unsubstituted or substituted in the phenyl ring by $C_1$–$C_4$-alkyl, $C_1$–$C_4$alkoxy, $C_2$–$C_4$alkanoylamino, hydroxyl, carboxyl, sulfo, carbamoyl, ureido or halogen; or $C_5$–$C_7$-cycloalkyl which is unsubstituted or substituted by $C_1$–$C_4$alkyl.

4. A process for the preparation of a reactive dye according to claim 1, which comprises reacting a compound of the formula (8)

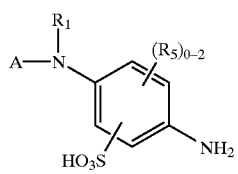

(8)

with a compound of the formula (9)

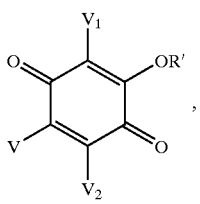

(9)

to give a compound of the formula (10)

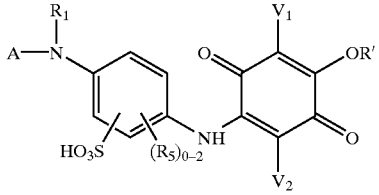

(10)

reacting the compound of the formula (10) with a compound of the formula (11)

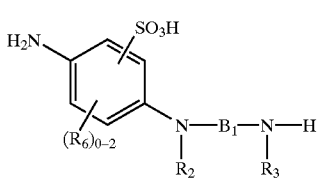

(11)

to give a compound of the formula (12)

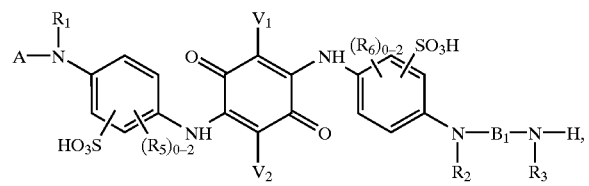

(12)

cyclizing the compound of the formula (12) to give a compound of the formula (13)

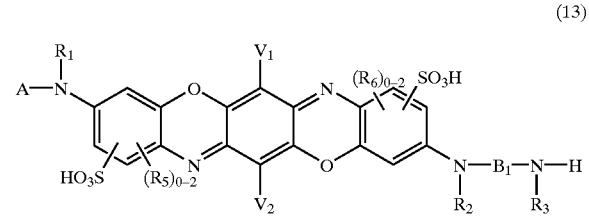

(13)

and subjecting the compound of the formula (13) to a condensation reaction in any desired sequence with 2,4,6-trihalogeno-s-triazine and a compound of the formula (14)

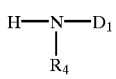
(14)

to give a compound of the formula (15)

Y is vinyl, β-chloroethyl or β-sulfatoethyl,
m is the number 2 or 3,
$R_{16}$ is hydrogen, $C_1$–$C_4$alkyl or phenyl,
$R_{17}$ is hydrogen, cyano, carbamoyl or sulfomethyl,
$R_{19}$ is hydrogen, methyl or ethyl, and
$X_2$ is chlorine or fluorine.

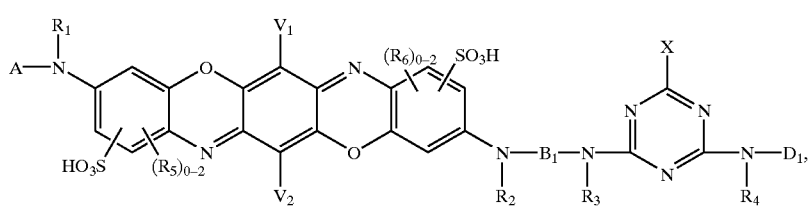
(15)

in which $R_1$, $R_2$, $R_3$, $R_4$, $(R_5)_{0-2}$, $(R_6)_{0-2}$, A, $B_1$, $D_1$, $V_1$ and $V_2$ are as defined in claim 1, R' is $C_1$–$C_4$alkyl, V is chlorine or bromine, and X is fluorine or chlorine.

5. A reactive dye according to claim 1, in which $D_1$ is a radical of the formula (6j')

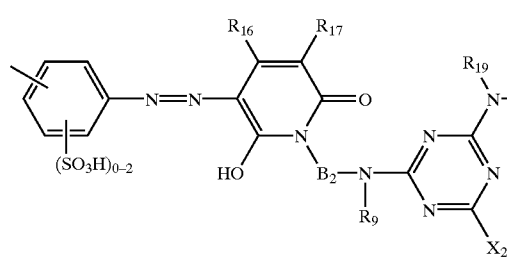
(6j')

in which
$B_2$ is $C_2$–$C_6$alkylene which is unsubstituted or substituted by hydroxyl, sulfo, carboxyl or sulfato,
$D_2$ is a radical of the formula (7)

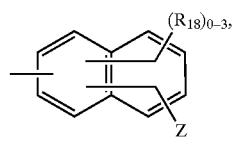
(7)

in which
$(R_{18})_{0-3}$ is 0 to 3 identical or different substituents selected from the group consisting of halogen, $C_1$–$C_4$alkyl, $C_1$–$C_4$alkoxy, carboxyl, nitro and sulfo and
Z is a radical of the formula (2a), (2c), (2d) or (2e)

—SO$_2$—Y (2a),

—CONR$_8$—(CH$_2$)$_m$—SO$_2$—Y (2c),

—NH—CO—CH(hal)—CH$_2$—hal (2d)

or

—NH—CO—C(hal)=CH$_2$ (2e)

in which
$R_8$ and $R_9$ are hydrogen,
hal is bromine,

6. A reactive dye according to claim 1, in which $D_1$ is a radical of the formula (6j'')

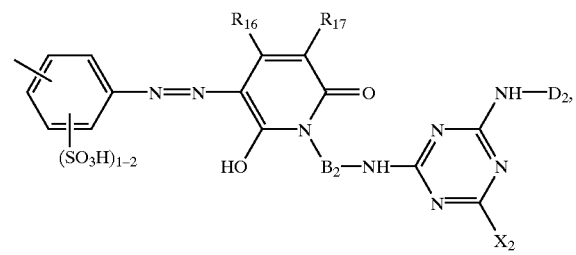
(6j'')

in which
$B_2$ is $C_2$–$C_4$alkylene,
$D_2$ is a radical of the formula (7a), (7b), (7c) or (7d),

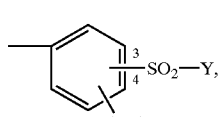
(7a)

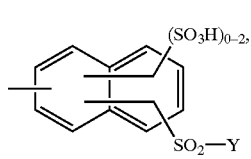
(7b)

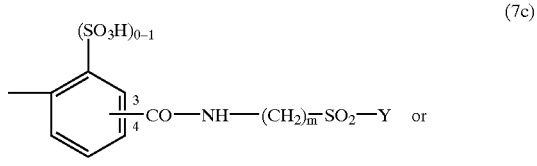
(7c)

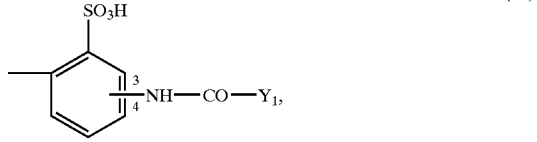
(7d)

in which
$(R_{18})_{0-2}$ is 0 to 2 identical or different substituents selected from the group consisting of halogen, $C_1$–$C_4$alkyl, $C_1$–$C_4$alkoxy and sulfo, Y is vinyl, β-chloroethyl or β-sulfatoethyl,
$Y_1$ is a group —CH(Br)—CH$_2$—Br or —C(Br)=CH$_2$ and
m is the number 2 or 3, in which
$R_{16}$ is methyl or ethyl,
$R_{17}$ is carbamoyl or sulfomethyl, and
$X_2$ is fluorine or chlorine.

7. A process for dyeing or printing a fibre material containing hydroxyl groups or containing nitrogen, which comprises applying to said fibre material a reactive dye of formula (1) according to claim 1.

8. A reactive dye according to claim 1, which has the formula (1a)

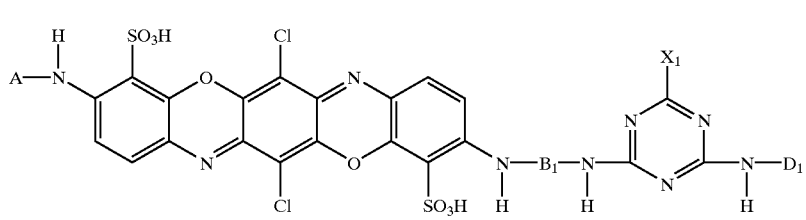

(1a)

in which A, $B_1$, $D_1$ and $X_1$ are as defined in claim 1.

9. A reactive dye according to claim 8, in which

A is $C_1$–$C_4$alkyl which is unsubstituted or substituted by hydroxyl, sulfo, carboxyl or sulfato; phenyl which is unsubstituted or substituted by $C_1$–$C_4$alkyl, $C_1$–$C_4$alkoxy, $C_2$–$C_4$alkanoylamino, hydroxyl, carboxyl, carbamoyl, sulfo or halogen; phenyl-$C_1$–$C_4$alkylene which is unsubstituted or substituted in the phenyl ring by $C_1$–$C_4$alkyl, $C_1$–$C_4$alkoxy, $C_2$–$C_4$alkanoylamino, hydroxyl, carboxyl, sulfo, carbamoyl, ureido or halogen; or $C_5$–$C_7$cycloalkyl which is unsubstituted or substituted by $C_1$–$C_4$alkyl, $B_1$ is a $C_2$–$C_{12}$alkylene radical, which can be interrupted by 1, 2 or 3 —O— members and is unsubstituted or substituted by hydroxyl, sulfo, sulfato, cyano or carboxyl, or phenylene which is unsubstituted or substituted by $C_1$–$C_4$alkyl, $C_1$–$C_4$alkoxy, $C_2$–$C_4$alkanoylamino, sulfo, halogen or carboxyl, $X_1$ is fluorine or chlorine, $D_1$ is a radical of the formula (6j'),

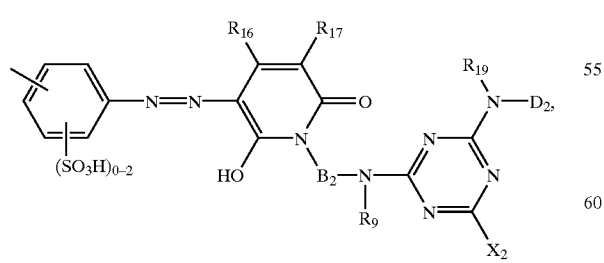

(6j')

in which
$B_2$ is $C_2$–$C_6$alkylene which is unsubstituted or substituted by hydroxyl, sulfo, carboxyl or sulfato, $D_2$ is a radical of the formula (7)

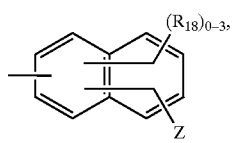

(7)

in which $(R_{18})$0-3 is 0 to 3 identical or different substituents selected from the group consisting of halogen, $C_1$–$C_4$alkyl, $C_1$–$C_4$alkoxy, carboxyl, nitro and sulfo and Z is a radical of the formula (2a), (2c), (2d) or (2e)

—SO$_2$—Y      (2a),

—CONR$_8$—(CH$_2$)$_m$—SO$_2$—Y      (2c),

—NH—CO—CH(hal)—CH$_2$—hal      (2d)

or

—NH—CO—C(hal)=CH$_2$      (2e), in which
$R_8$ and $R_9$ are hydrogen,
hal is bromine,
Y is vinyl, β-chloroethyl or β-sulfatoethyl,
m is the number 2 or 3,
$R_{16}$ is hydrogen, $C_1$–$C_4$alkyl or phenyl,
$R_{17}$ is hydrogen, cyano, carbamoyl or sulfomethyl,
$R_{19}$ is hydrogen, methyl or ethyl, and
$X_2$ is chlorine or fluorine.

10. A reactive dye according to claim 8, in which
A is $C_1$–$C_4$alkyl substituted by hydroxyl or sulfato,
$B_1$ is a radical of the formula —$CH_2$—$CH(CH_3)$— or —$(CH_3)CH$—$CH_2$—,
$X_1$ is fluorine or chlorine,
$D_1$ is a radical of the formula (6j″),

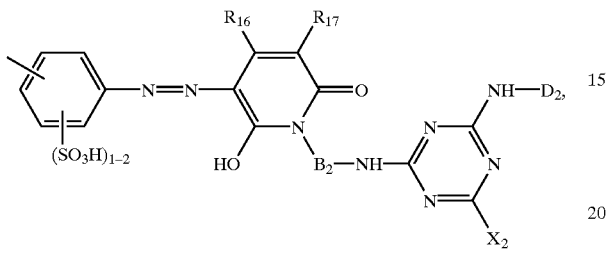

(6j″)

in which
$B_2$ is ethylene,
$D_2$ is a radical of the formula (7a)

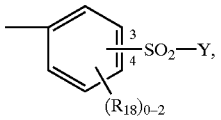

(7a)

in which $(R_{18})_{0-2}$ is 0 to 2 identical or different substituents selected from the group consisting of methyl, methoxy and sulfo,
Y is vinyl or β-sulfatoethyl $(R_{18})_{0-2}$,
$R_{16}$ is methyl,
$R_{17}$ is carbamoyl or sulfomethyl and
$X_2$ is fluorine or chlorine.

11. A process according to claim 7, wherein said fibre material is cellulosic fibre material.

12. A process according to claim 7, wherein said fibre material is cotton.

* * * * *